United States Patent [19]

Ikenoue et al.

[11] Patent Number: 4,991,972

[45] Date of Patent: Feb. 12, 1991

[54] CONTROL APPARATUS FOR A PRINTER

[75] Inventors: Yoshikazu Ikenoue, Fort Lee, N.J.; Kiyoshi Emori; Makoto Sekiya, both of Aichi, Japan

[73] Assignee: Minolta Camera Kabushiki Kaisha, Osaka, Japan

[21] Appl. No.: 72,722

[22] Filed: Jul. 13, 1987

[30] Foreign Application Priority Data

| Jul. 14, 1986 | [JP] | Japan | 61-165754 |
| Jul. 14, 1986 | [JP] | Japan | 61-165755 |
| Jul. 14, 1986 | [JP] | Japan | 61-165756 |
| Jul. 21, 1987 | [JP] | Japan | 62-126824 |

[51] Int. Cl.$^5$ .................................................. G06F 15/20
[52] U.S. Cl. ...................................... 364/519; 364/518
[58] Field of Search .............................. 364/518–519, 364/521; 340/750, 798, 799, 800; 346/33 R

[56] References Cited

U.S. PATENT DOCUMENTS

| 4,648,047 | 3/1987 | Berkland et al. | 364/519 |
| 4,675,833 | 6/1987 | Cheek et al. | 364/523 |
| 4,694,405 | 7/1987 | Bradbury et al. | 364/518 |
| 4,698,755 | 10/1987 | Okazaki et al. | 364/519 |
| 4,737,923 | 4/1988 | Matsuzaki et al. | 364/519 |
| 4,769,648 | 9/1988 | Kishino et al. | 364/519 X |

Primary Examiner—Gary V. Harkcom
Assistant Examiner—H. R. Herndon
Attorney, Agent, or Firm—Price, Gess & Ubell

[57] ABSTRACT

A control apparatus for controlling a printer in which a memory for memorizing data to be printed is sent from an external processor and a capability for deleting data memorized in the memory is provided. Data in memory is deleted according to a control code sent from the external data processor or entered through an operation panel. A range of data to be deleted is determined based on a control code given.

12 Claims, 26 Drawing Sheets

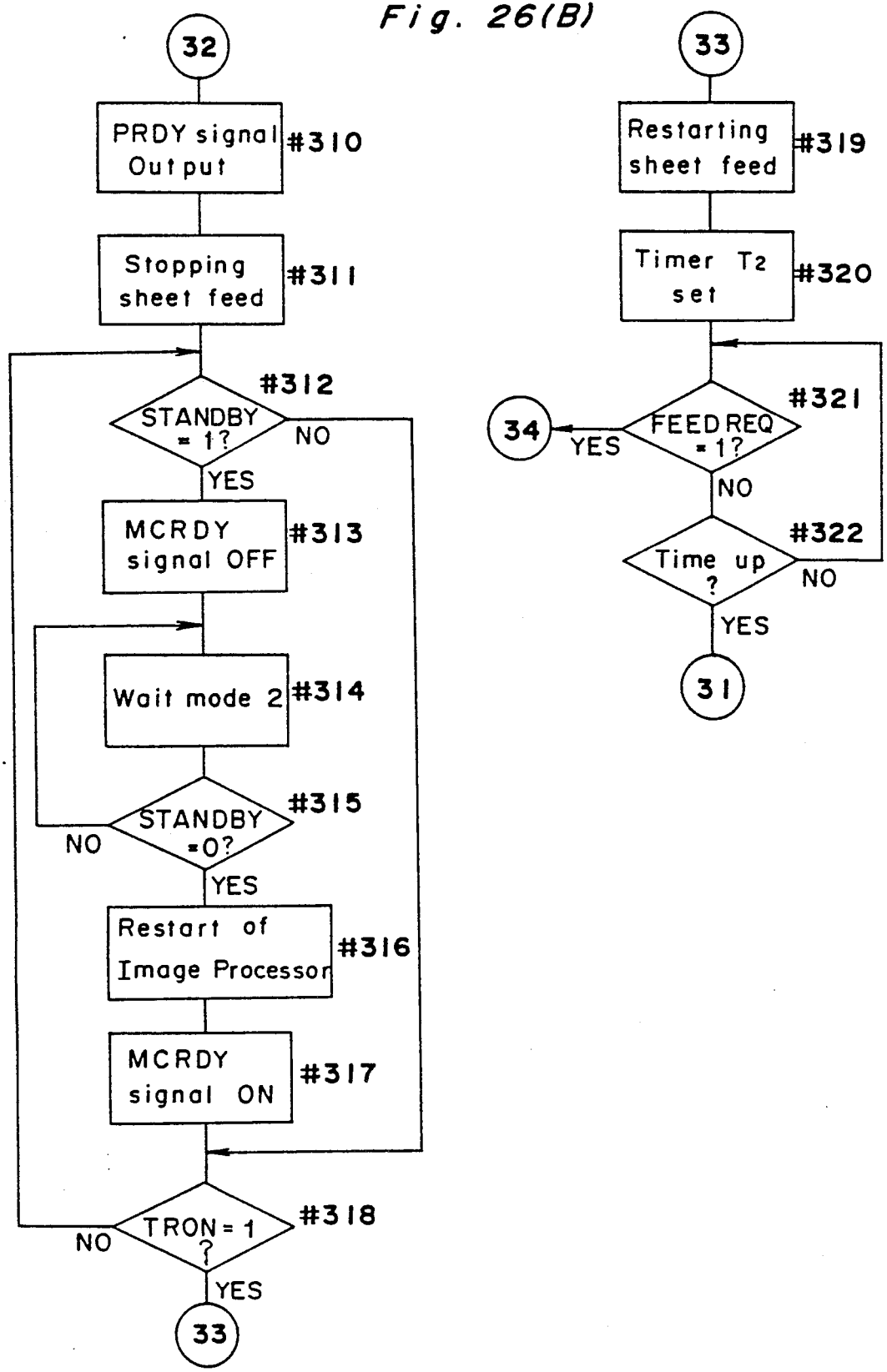

CONTROL APPARATUS FOR A PRINTER

BACKGROUND OF THE INVENTION

1. Field of the Invention

The present invention is related to a control apparatus for a printer, particularly to a suspension control of the print.

2. Description of the Prior Art

Generally speaking, a printing speed by a printer is rather slow when compared with a transmitting speed of data from a data processor such as a host computer to the printer. In order to speed up the printing speed, there is provided a buffer of large capacity for storing data in a printer. Namely, data sent to the printer are stored in said buffer temporarily and the printer carries out a print of data by reading out data stored in said buffer successively.

In the case that such a buffer as mentioned above is not provided in the printer, there is employed such a system in that a buffer of large capacity is interposed between the printer and the data processor.

Meanwhile, in case of a transmission error caused upon transmitting data from the data processor such as a misidentification of a file or in case a jamming is caused in the printer, the data transmission from the data processor can be suspended at once.

However, since the printing operation regarding data having been memorized in the buffer of the printer or the external buffer cannot be suspended at once, an unnecessary print is carried out. Further, in the case of printing a graphic image, a user must wait a long time until an unnecessary print has been finished even if the suspension of print was commanded. Although there may be considered a method in which the power supply to the printer is cut off forcibly at that time, data sent by another data processor or data made by another users are deleted at the same time in the case wherein a plurality of data processors are connected thereto or files of other users are stored in the buffer. This problem regarding the suspension of the printer becomes more serious as the capacity of the buffer becomes large.

Further, in a conventional printer, only a function for cancelling data being printed at the moment is provided and, therefore, it is impossible to suspend the print of individual pages or files (groups of pages) and/or all files.

SUMMARY OF THE INVENTION

One object of the present invention is to provide a control apparatus for a printer which is able to suspend a print according to at least one control code sent from an external data processor such as a host computer.

Another object of the present invention is to provide a control apparatus for a printer which is able to delete data according to individual control codes sent from an external data processor or entered through an entry means such as an operation key board.

Further object of the present invention are is to provide a control apparatus for a printer being able to vary a range of data to be deleted according to individual control codes received.

Other objects of the present invention are to provide a control apparatus for a printer which is able to delete data having been indicated that a sheet on the way to print is to be discharged or that the print is to be suspended.

In order to accomplish these objects, according to the present invention, there is provided a control apparatus for controlling a printer comprising communication means for communicating data to be printed and control data having functions different from those of the former with an external data processor, memory means for memorizing at least either of said data to be printed and intermediate codes transformed from said data and control data, print control means for printing images read out from said memory means, entry means for entering some of said control data and deletion means for deleting data including predetermined data based upon control code entered from said entry means as far as said predetermined data are memorized in said memory and for outputting predetermined data to said external data processor via said communication means if any predetermined data is not memorized in said memory means.

According to the invention of the present application, there is also provided a control apparatus for controlling a printer comprising receive means for receiving data to be printed and control data having functions different from those of said data to be printed, memory means for memorizing at least either of said data to be printed and intermediate data transformed therefrom among data received, print control means for printing according to data read out from said memory means, and suspension means for executing a compulsory discharge of a pertinent sheet or for deleting data which are demanded to suspend the print when said receive means receives control data indicating the suspension of print.

Further, there is provided, according to the invention of the present application, a control apparatus for controlling a printer comprising receive means for receiving data to be printed and control data having functions different from those of said data to be printed, memory means for memorizing at least either of said data to be printed and intermediate data transformed therefrom among data received, print control means for printing according to data read out from said memory means, entry means for entering a plurality of control data, and deletion means for deleting data memorized in said memory means according to control data entered from said entry means.

BRIEF DESCRIPTION OF DRAWINGS

These and other objects and features of the present invention will be more apparent when the preferred embodiment of the present invention is described in detail with reference of accompanied drawings in that, FIG. 1 is a block diagram showing a system of an electro-photographic printer, FIGS. 26(A)–26(B) are a flow chart showing operations of the electro-photographic controller.

DESCRIPTION OF THE PREFERRED EMBODIMENT

Figure 1:
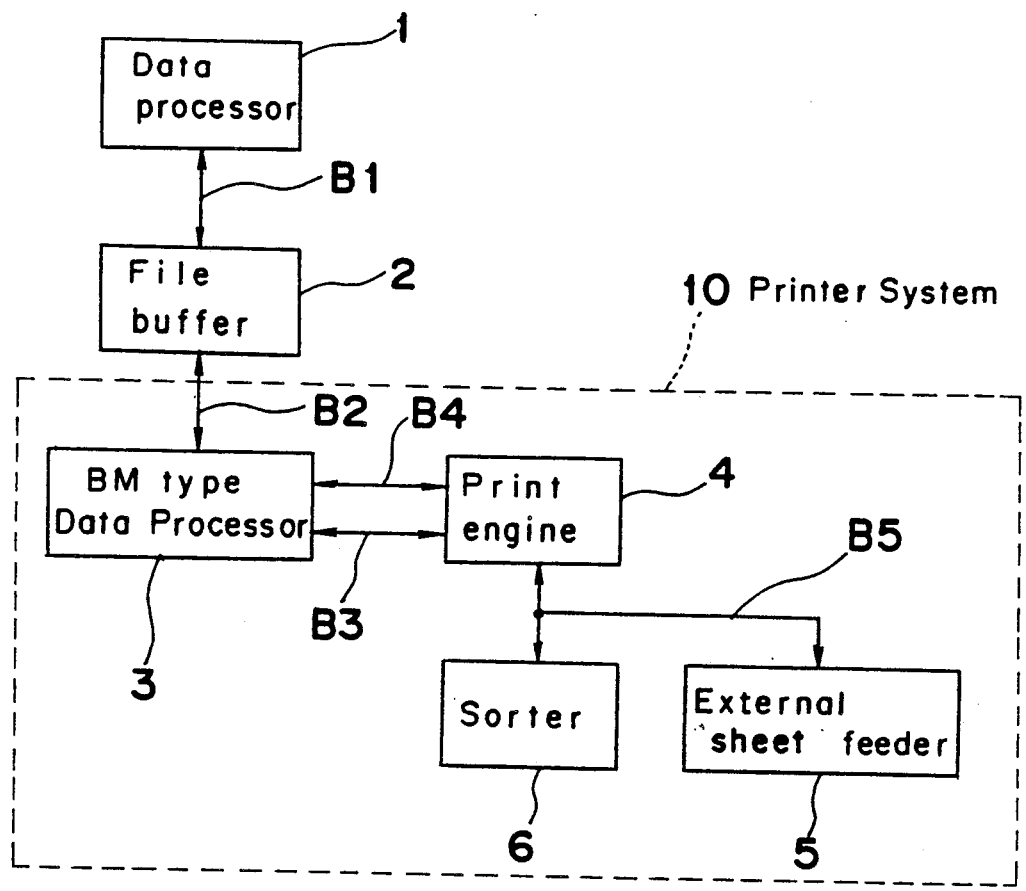

The preferred embodiment according to the present invention will be described in the order of items as follows;
(a) Composition of Electro-photographic Printer
(b) Managing method of Buffer memory
(c) Flow chart of Bit-map control
(d) Flow chart of Interface control
(e) Flow chart of Electro-photographic control
(f) Flow chart of Printing head control (a) Composition of Electro-photographic printer FIG. 1 is a block diagram of a printing system which is able to print a graphic image according to the preferred embodiment of the present invention.

Data offered from a data processor 1 are stored into an exterior file buffer 2 once in order to improve the through-put due to the data processor and, then, data stored therein are outputted to a printer system 10. The printer system 10 includes a data-processor 3 which processes data with use of so called bit map method, a print engine 4 which utilizes the electro-photographic process and laser beam and attachments such as an external sheet feeding unit 5 and sorter 6.

Figure 2:
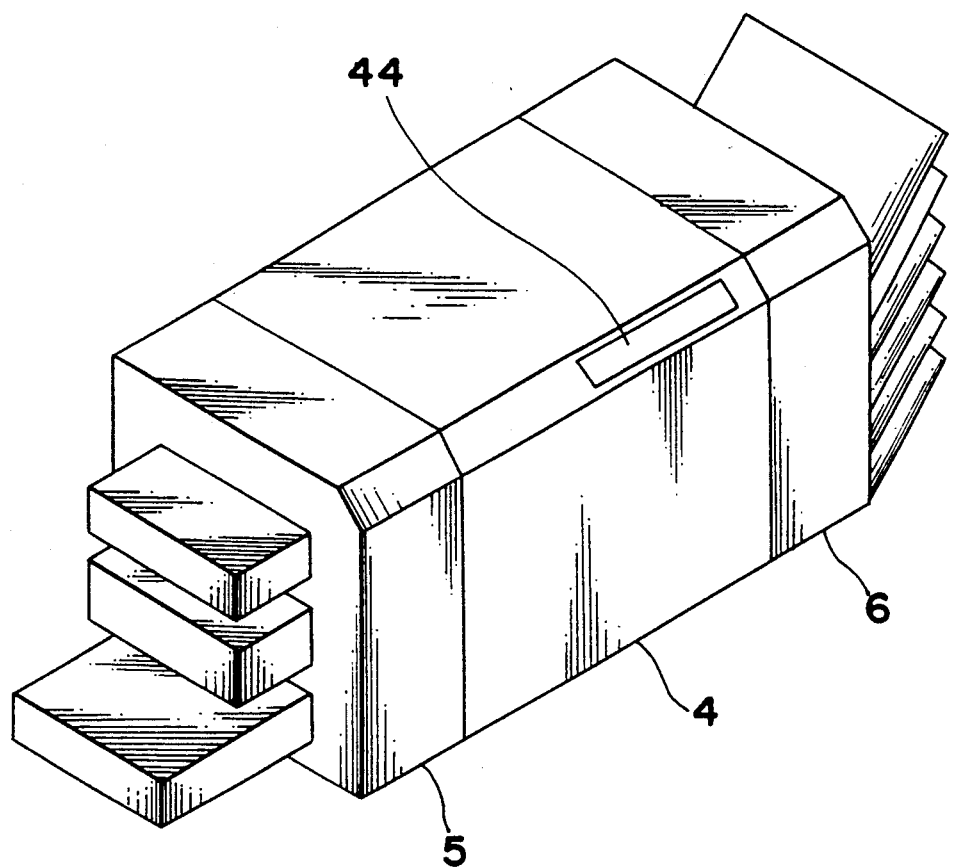
FIG. 2 is a perspective view of a print engine.

FIG. 2 is a schematic perspective view of the printer system 10. The print engine 4 comprises the data processor 3 of bit map type therein and the external sheet feeding unit 5 and sorter 6 can be connected thereto as an option. Further, there is arranged an operation panel 44 on the front upper portion of the print engine 4 on which a variety of displays and some operation keys for indicating individual operations.

Figure 3:
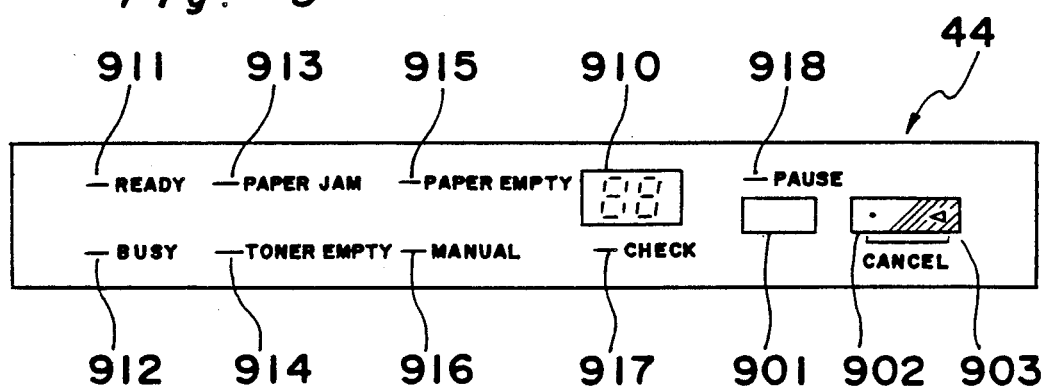
FIG. 3 is a plan view of an operation panel.

FIG. 3 is a plan view of the operation panel 44 on which operation keys 901, 902 and 903 and display means 910 through 918 are arranged. The key 901 is a PAUSE key for stopping the printing operation for a moment. The key 902 is assigned specific function such as starting a test-print. The key 903 is a shift key which acts as a CANCEL key for suspending the printing operation if it is operated together with the key 902. The reason why the cancel function is activated for suspending the printing operation only if both of these two keys 902 and 903 are operated is to avoid a suspension thereof due to a careless operation.

Figure 4:
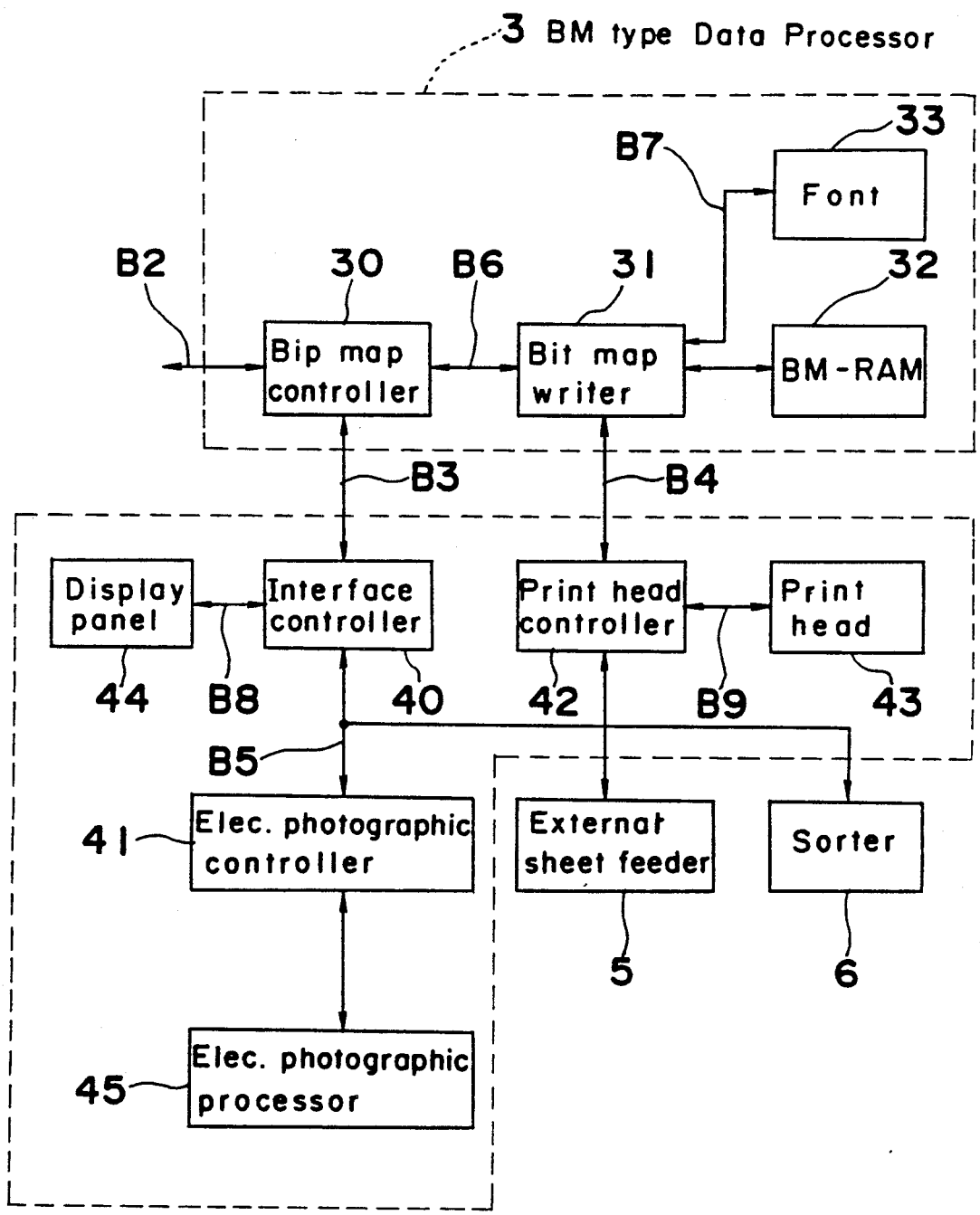
FIG. 4 is a block diagram showing a data processor of bit map type and a print engine.

FIG. 4 is a block diagram for showing the composition of the printer system. The data processor 3 of bit map type is essentially comprised of a bit map controller 30 (See FIG. 5), a RAM (randon access memory) 32 for a bit map (hereinafter referred to BM-RAM) write means 31 (See FIG. 6) for writing bit map data on the BM-RAM 32 and font means 33. Data communication between the data processor 3 and the printer engine 4 is done through a control bus B3 provided for control data such as the number of print, commands for the attachments or the like and a bus B4 provided for image data.

As shown in FIG. 4, the print engine 4 comprises three controllers. One of them is an interface controller 40 which is provided for processing control data from the bit map controller 30, controlling the operation panel 44 and controlling operation timings regarding to the print engine 4. The electro-photographic controller 41 (See FIG. 8) controls an electro-photographic processor 45 according to data sent from the interface controller 40 through an internal bus B5.

The print head controller 42 (See FIG. 9) controls the light intensity of a semiconductor laser 431 and the driving of a motor 432 for a polygon mirror in the printer head 43 according to information data being sent from the interface controller 40 via the internal bus B5 in order to write image data into the BM-RAM 32 which are sent, via the internal bus B4, from the bit map writing controller 31. Also, the external sheet feeding unit 5 and sorter 6 are controlled, via the internal bus B5, by the interface controller 40. The printer system 10 mentioned above is a so called laser printer of bit map type. Character data (almost all of them are represented as character codes) sent from the data processor 1 are transformed into real character images which are to be stored in the BM-RAM 32 of the processor 3 of bit map type and these character images in the BM-RAM 32 are outputted to the print engine 4. The print engine 4 modulates the laser beam according to data from the processor 3 to record character images on a photosensitive medium and character images are transferred on a printing sheet.

There are included codes for designating a printing format and for indicating a mode for the print engine other than character data. The data processor 3 of bit map type analizes protocols of these codes other than character data and gives instructions for the control of the format, the pass of a printing sheet and the change of modes of option devices to the print engine 4 when these are needed. The printer engine 4 carries out, in addition to the control of recording, the control of the electro-photographic system, the timing control of a printing sheet and, further, the process control synchronized to the pass of a printing sheet to another optional device. The control method of the print engine 4 is similar to that of an electro-photographical copy machine except for the scanning system.

The controller of each unit comprises at least one microcomputer as a main component. For example, the data processor 3 of bit map type comprises one microcomputer 301 (See FIG. 5) and the print engine 4 comprises three microcomputers 400, 410 and 420 (See FIGS. 7, 8 and 9, respectively). These three microcomputers are assigned to following functions, respectively. The first microcomputer 400 has a role for executing the management of the print engine system including the print engine and the options as a whole. The second microcomputer 410 executes the control for the electro-photographic process and/or the pass of a printing sheet and the third microcomputer 420 controls timings between image data from the processor 3 and a feed of a printing sheet and, also the laser optical system.

These will be explained in detail hereinafter.

Figure 5:
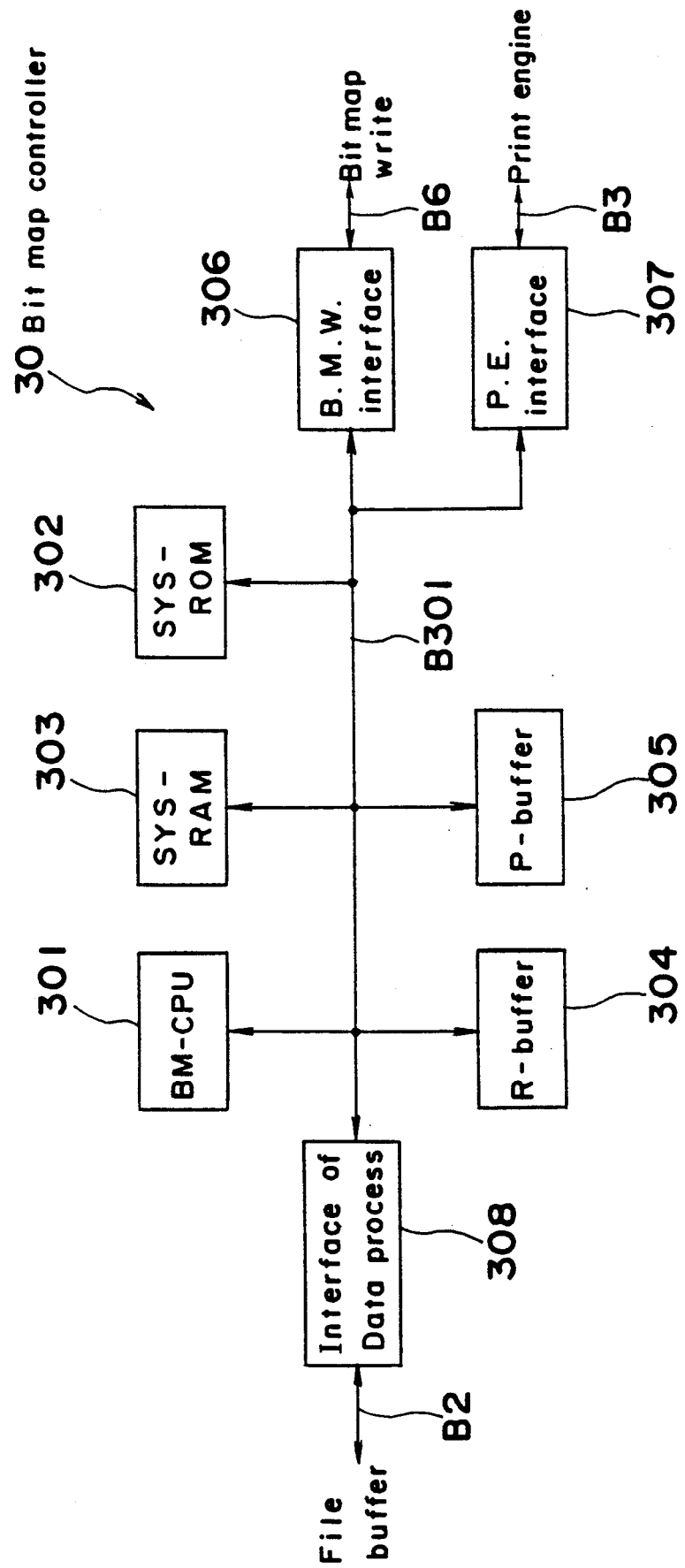
FIG. 5 is a block diagram of a bit map controller.

FIG. 5 is a block-diagram showing the bit map controller 30. This controller 30 is comprised of some blocks which are connected by the internal buses. The microcomputer 301 (hereinafter, referred to BM-CPU) is a main component of the data processor 3 of bit map type which carries out the communication, via the interface 308 thereof, between the data processor 1 and/or the external file buffer 2, transforms printing data, controls the bit map writing controller 31 through the interface 306 therefor and, further, controls the print engine 4 through the interface 307 provided therefor. The ROM 302 (SYS-ROM) stores programs for the microcomputer. The RAM 303 (SYS-RAM) is provided as memory means of the BM-CPU 301 for memorizing and statuses of fundamental stacks and flags.

A buffer 304 (hereinafter referred to R-buffer) is provided as a communication buffer for communicating with the external apparatus such as the external data processor 1 or the file buffer 2 which enables the communication between the BM-CPU 301 and the external data processor 1 to carry out even in an asynchronous state.

A packet buffer 305 (hereinafter referred to P-buffer) is provided for memorizing intermediate codes (hereinafter, referred to "packet") which have been transformed from data given by the external data processor 1 according to the attribute of a font in order to make the writing into the BM-RAM 32 easy.

The actual imaging according to the font designated is carried out by the bit map writing controller 31. In order for this, it is necessary to calculate parameters such as address data of individual patterns of the font and address data of areas of the BM-RAM 32 on which individual patterns are to be formed. However, it takes a relatively long time to calculate these parameters.

In order to shorten the processing time, according to the present invention, there is provided such a method that data in the next page to be printed are processed in advance during printing data stored in the BM-RAM 32. In order for that, so called first-in first-out (FIFO) buffer is employed as the packet buffer 305 in which data are stored in the order of input and outputted in the same order.

An interface 307 is provided for the print engine to communicate job informations such as a number of print and job control commands such as a print-command via an interface of the print engine 4 and the bus B3.

Figure 6:
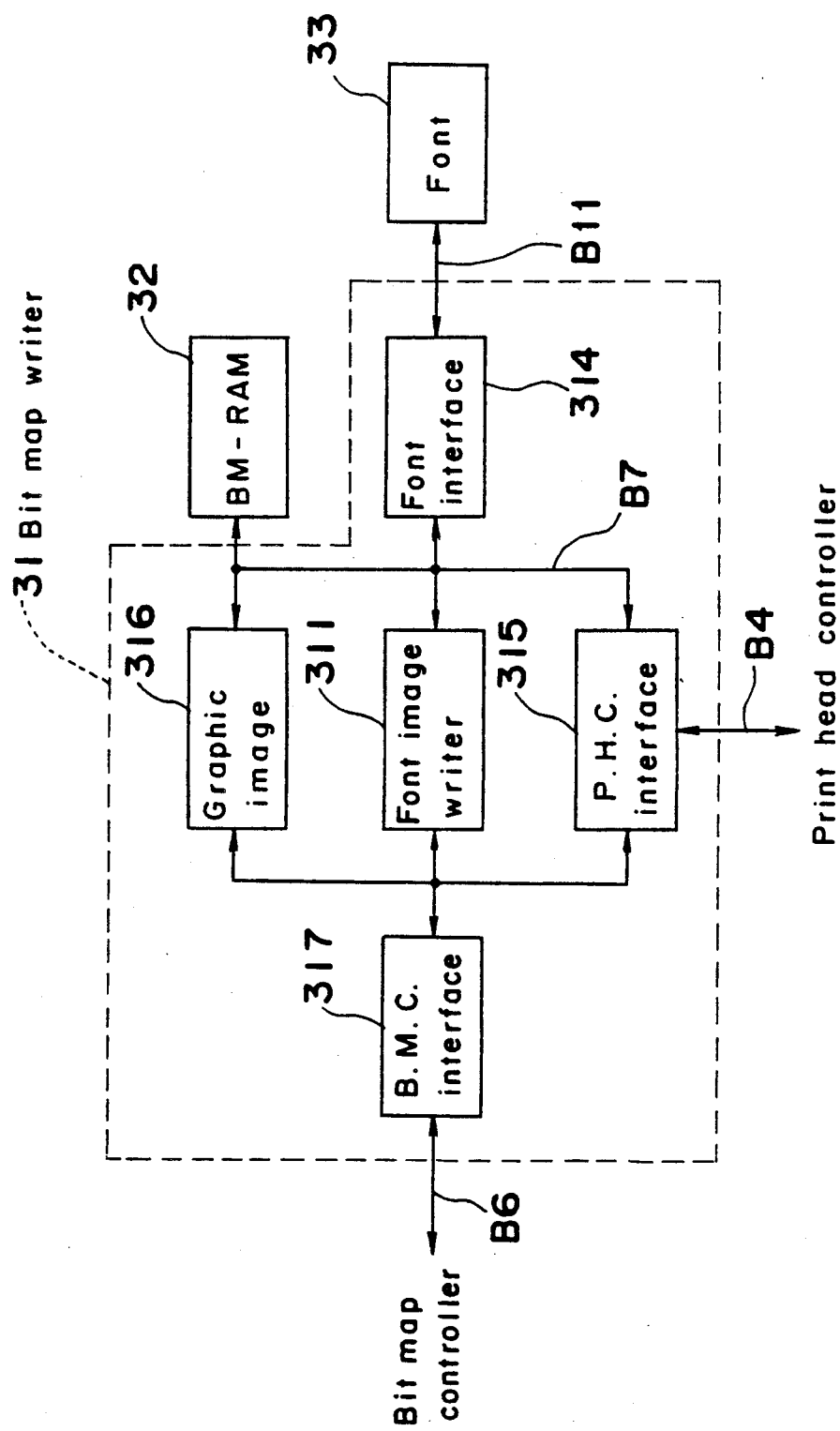
FIG. 6 is a block diagram of a bit map write means.

FIG. 6 shows a block diagram of the bit-map writing circuit 31. This bit-map writing circuit 31 has a function for writing images into the BM-RAM 32 and a function for outputting data in the BM-RAM 32 toward the print engine upon printing. The writing function for the BM-RAM 32 is classified further into a graphic image writing function for writing geometric configurations such as lines and/or circles which is executed by a graphic image writing means 316 and a font writing function executed by a font image writing means 311. Both writing means are logic means being operated according to packet signals sent from the bit map controller through an interface 317 thereof. Almost all of processings executed by the graphic image writing means 316 are done by writing graphic images into the BM-RAM 32 which are obtained by analizing parameters contained in packet signals. Contrary to this, almost all of processings are done by writing font images into the BM-RAM 32 which are read by a font means 33 through an interface 314 thereof according to data contained in packet signals.

Meanwhile, a function for outputting data needed for printing is executed by an interface 315 of the print head controller. When said interface 315 receives a print start code sent from the bit-map controller 30 through an interface 317, it outputs data in the BM-RAM 32 to the print head controller 42 of the print head 4 according to synchronized signals, via the bus B4, sent therefrom (See FIG. 9).

Figure 7:
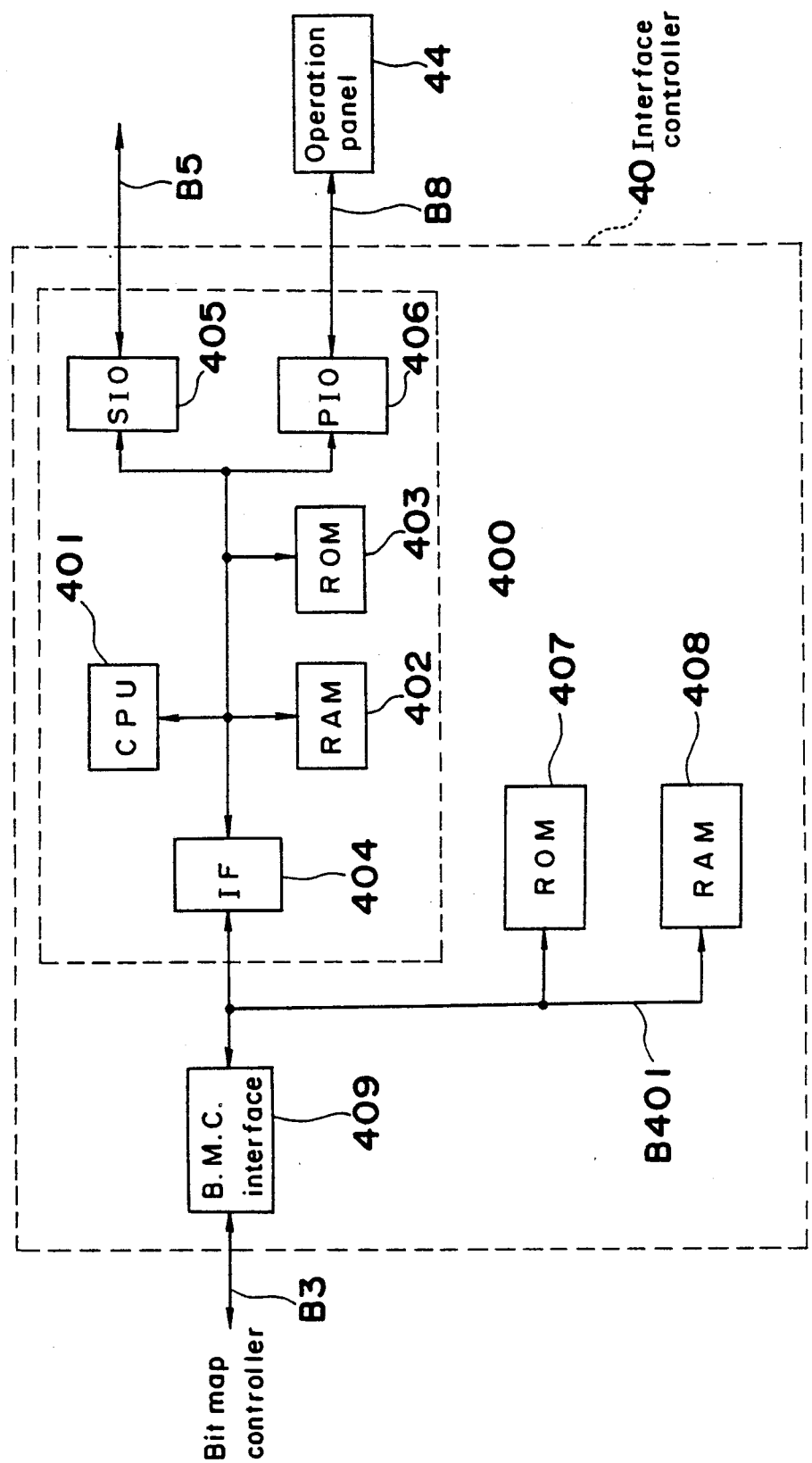
FIG. 7 is a block diagram of an interface controller.

FIG. 7 is a block-diagram of an interface controller (IFC) 40 of the print engine 4. The interface controller 40 is provided with an IFC-CPU 400 being comprised of a microcomputer of one tip as a main component thereof. An external ROM 407, RAM 408 and an interface 409 for the connection to the bit map controller 30 are connected via a bus B401 with an interface 404 of IFC-CPU 400. The external ROM 407 is exchangeable by a socket means and a special program is stored therein according to a user's necessity whereas a standard program is stored in an internal masked ROM 403 of IFC-CPU 400. The external RAM 408 is provided to supplement a shortage in capacity of the internal RAM 402.

A serial input-output means (SIO) 405 for serial communication and a parallel input-output means (PIO) 406 are provided in IFC-CPU 400. SIO 405 communicates control data via a bus B5 with the electro-photographic controller 41 and the print head controller 42 for controlling them. PIO 406 is used to communicate for controlling the operation panel 44.

Figure 8:
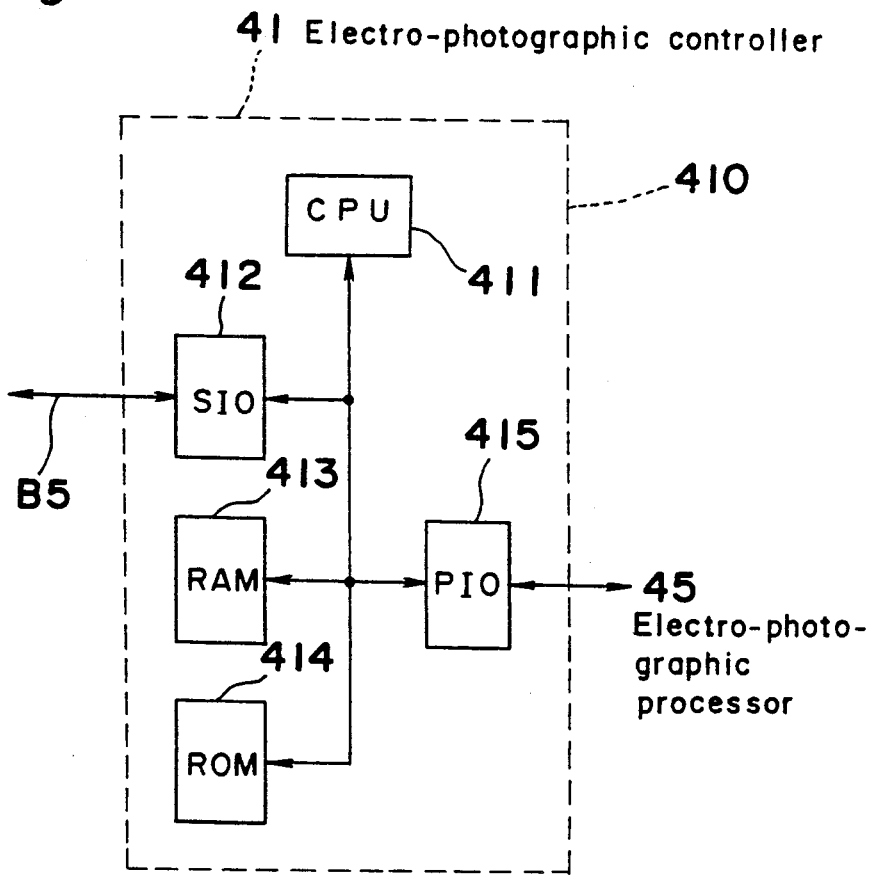
FIG. 8 is a block diagram of an electro-photographic controller.

FIG. 8 is a block-diagram of the electro-photographic controller 41. This is controlled by MC-CPU 410 comprised of a one-tip microcomputer similar to IFC-CPU 400. A RAM 413 and ROM 414 are connected thereto. Contrary to the interface controller 40, the electro-photographic controller 41 is limited to a standard program without expanding the system. SIO 412 communicates with the interface controller 40 through the bus B5. PIO 415 is used as an input-output means for controlling the process.

Figure 9:
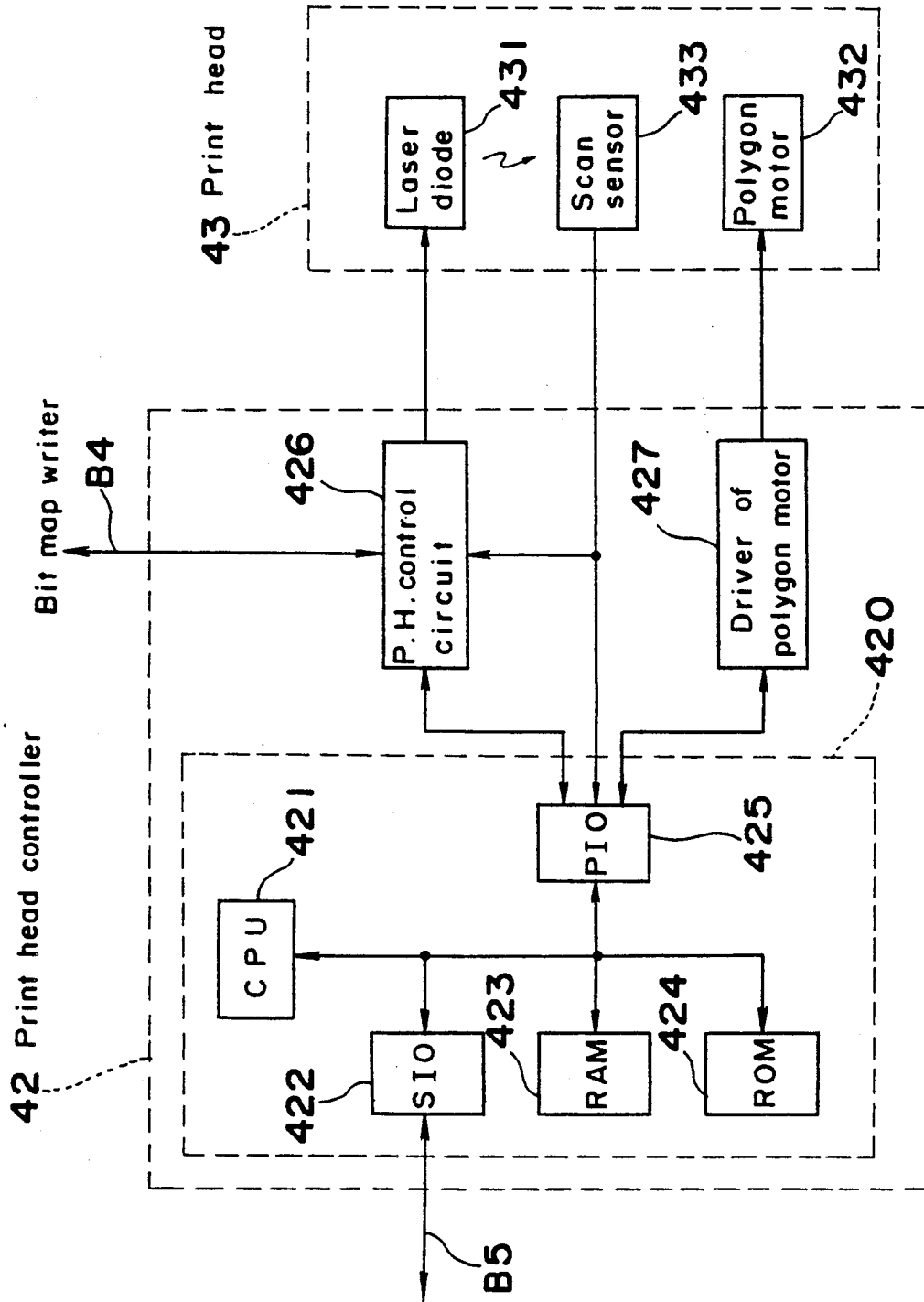
FIG. 9 is a block diagram of a print head controller and a print head.

FIG. 9 is a block-diagram of the print head controller 42.

The print head controller 42 controls a motor 432 for driving a polygon mirror (not shown) provided in the print head 43, based on data sent from the interface controller 40 through the bus B5 and controls a semiconductor laser diode 431 in a manner synchronized with signals outputted from a detection means (SOS) 433 for detecting a scanning position of the laser scan by said laser diode 431 in order to form images according to image data.

The print head controller 42 provides a one-tip microcomputer 420 as a main component, similarly to the electro-photographic controller 41. To a serial input-output means (SIO) 422 provided therein, there is connected the bus B5 for communicating with the interface controller 40. A driver 427 for the polygon motor 432, a scan detector (SOS) 433 and a control circuit 426 of the print head for controlling an emission of a semiconductor laser according to image data sent from the data processor 3 of bit map type are connected to a parallel input-output means (PIO) 425.

The image data sent via the bus B4 are parallel data and are converted into serial data by the print head controller 426 in order to cause the semiconductor laser 431 to emit the light beam sequentially according to image signals. Further, this print head controller 426 generates timing signals to the interface 315 of the print head controller of the bit map write means 31 in order for a synchronization of transmission of image data.

(b) Managing method of Buffer memories

As explained above, in the bit map controller 30 (See FIG. 5), there is provided a R-buffer 304 as a buffer for communicating with the external devices 1 and 2. Further, there is provided a P-buffer 305 for memorizing intermediate codes (packets) transformed from data stored in R-buffer 304, which are made convenient upon writing image data in BM-RAM 32.

There may be various methods for managing buffers. It becomes necessary to select a method suitable for the present invention wherein data are managed in a unit of block predetermined and special data are searched.

In the present embodiment, a so called ring buffer method is employed to both of the communication buffer (R-buffer) 304 and the packet buffer (P-buffer) 305. This method is convenient to manage character data having an infinite total number of data such as print data.

Figure 10:
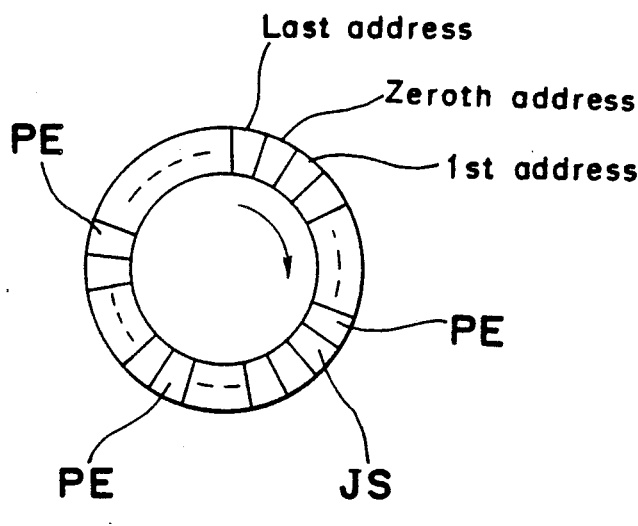
FIGS. 10 and 11 are schematical plan views for explaining a managing system of a buffer according to the present invention.
Figure 11:
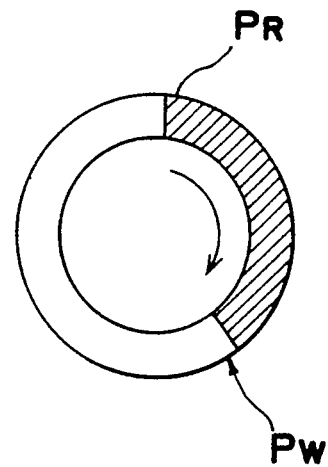

In this method, an area for memorizing data is designed as if it forms a ring as shown in FIG. 10. Namely, data are memorized from zero-th address in the order of address and, when reached to the last address, the address is returned to zero-th address. Accordingly, the memory has an endless structure. Upon managing data, there are used a write-pointer $P_W$ indicating a top address of a vacant area, i.e., an address for memorizing data next and a read pointer $P_R$ indicating an address of the oldest data having been memorized. FIG. 11 shows a relation between these two pointers $P_R$ and $P_W$. If the buffer is empty, these pointers coincide with each other ($P_R = P_W$) And, if the area is full, the read pointer $P_R$ indicates the next address of an address designated by the write pointer $P_W$. Therefore, the former ($P_R$) never exceeds the latter ($P_W$).

Among codes to be memorized in R-buffer 304, PAGE EJECT code (PE) indicating an end or a boundary of a preceding page is contained as a control code. Further, JOB START (JS) code indicating a boundary between two groups of pages is sent from the external devices 1 and 2 thereto. Other control codes are sent from the operation panel as will be explained later.

In P-buffer 305, there are stored character packets and control packets. Among control packets, PAGE EJECT code, JOB START code or the like are contained.

In R-buffer 304 and P-buffer 305, the read pointer $P_R$ is stepped up to a desirable address upon reading out a special data and the data at an address pointed by the read pointer $P_R$ is read out. In order to delete data having been memorized, the read pointer $P_R$ is moved forward so as to pass the address wherein data to be deleted is memorized since those data passed by the read pointer $P_R$ are put out of the management. In order to delete data from a head data, the write pointer $P_W$ is stepped back in a reverse direction.

In the present preferred embodiment, the write pointer $P_W$ is moved back in the case that a deletion of data is indicated from the external device and, in the case that it is commanded from the key board, the read pointer $P_R$ is forwarded. It is possible to delete data in both of these two buffers 304 and 305.

It is to be noted that a deletion in unit of page or file can be done if those control codes mentioned above are utilized upon the deletion of data. In order to delete all data contained in a page being printed at the present moment, either of two pointers $P_R$, $P_W$ is moved to an address of PAGE EJECT code. If all data contained in one lump of pages on print are to be deleted, the pointer is moved forward or back to an address of JOB START code. Accordingly, a range of data to be deleted can be identified by the kind of control code indicated.

(c) Flow chart of Bit-map control

Hereinbelow, operations of the present system will be stated referring to flow charts attached.

FIG. 12 to 16 are flow chart showing processes executed by the bit-map controller 30.

Figure 12:
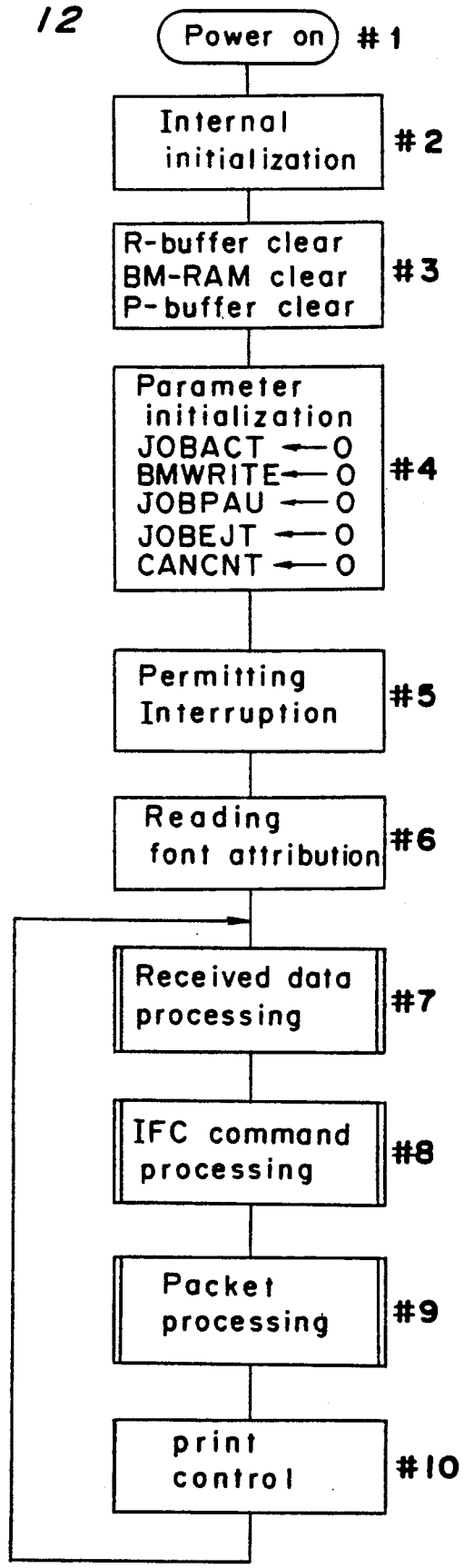
FIGS. 12 to 15 are flow charts for showing operations of the bit map controller, respectively.

In the flow chart shown in FIG. 12, when the power switch of the system is turned on at step #1, internal devices of the system are initialized at step #2. Then, at step #3, R-buffer 304, P-buffer 305 and BM-RAM 32 are cleared, respectively and, at step #4, parameters such as JOBACT, BMWRITE and so on are reset. After these initializations, the system is so set as to permit interruptions at step #5.

Roles of these parameters shown in the box of step are as follows;

JOBACT Indicating a printing state with respect to a certain page (namely, a print operation for printing sheets of a pre-set number has not been completed yet).

BMWRITE Indicating a state wherein at least one data has been written into BM-RAM 32.

JOBPAU Indicating a state wherein the printer is stopped temporarily.

JOBEJT An internal flag indicating a demand for starting the printer.

CANCNT A count number showing how many times CANCEL codes are received successively from the data processor 1.

At step #6, an attribute of font is read out from the font means 33 in order to determine a format for printing and, then, the process proceeds to a real processing loop.

In the real processing loop, there are executed four processings as follows;
Processing received data (step #7)
    Receiving data sent from the data processor 1 and transforming them into packets
Processing IFC commands (step #8)
    Processing data sent from the print engine
Processing packets (step #9)
    Writing images in BM-RAM 32 according to packets obtained
Print processing (step #10)
    Processing print sequences between the interface controller 40

Data sent from the data processor 1 are stored temporarily in R-buffer 304 as a receiving buffer by an interruption processing mentioned later in order to increase a through-put of data.

Character data received are read out from R-buffer 304 to transform them into packets and, then, packets data are stored in P-buffer 305 in step #7 for processing received data. These packets data are read out in step #9 for processing packets, bit images according to a font designated are written into BM-RAM 32 by the bit map write means 31. If a PAGE EJECT code demanding a printing operation is detected among packets, the printer is started to operate according to the print processing (step #10).

Other than processings mentioned above, a pause processing of the printer, suspension of the processing and the like are executed.

Processing received data

Figure 13:
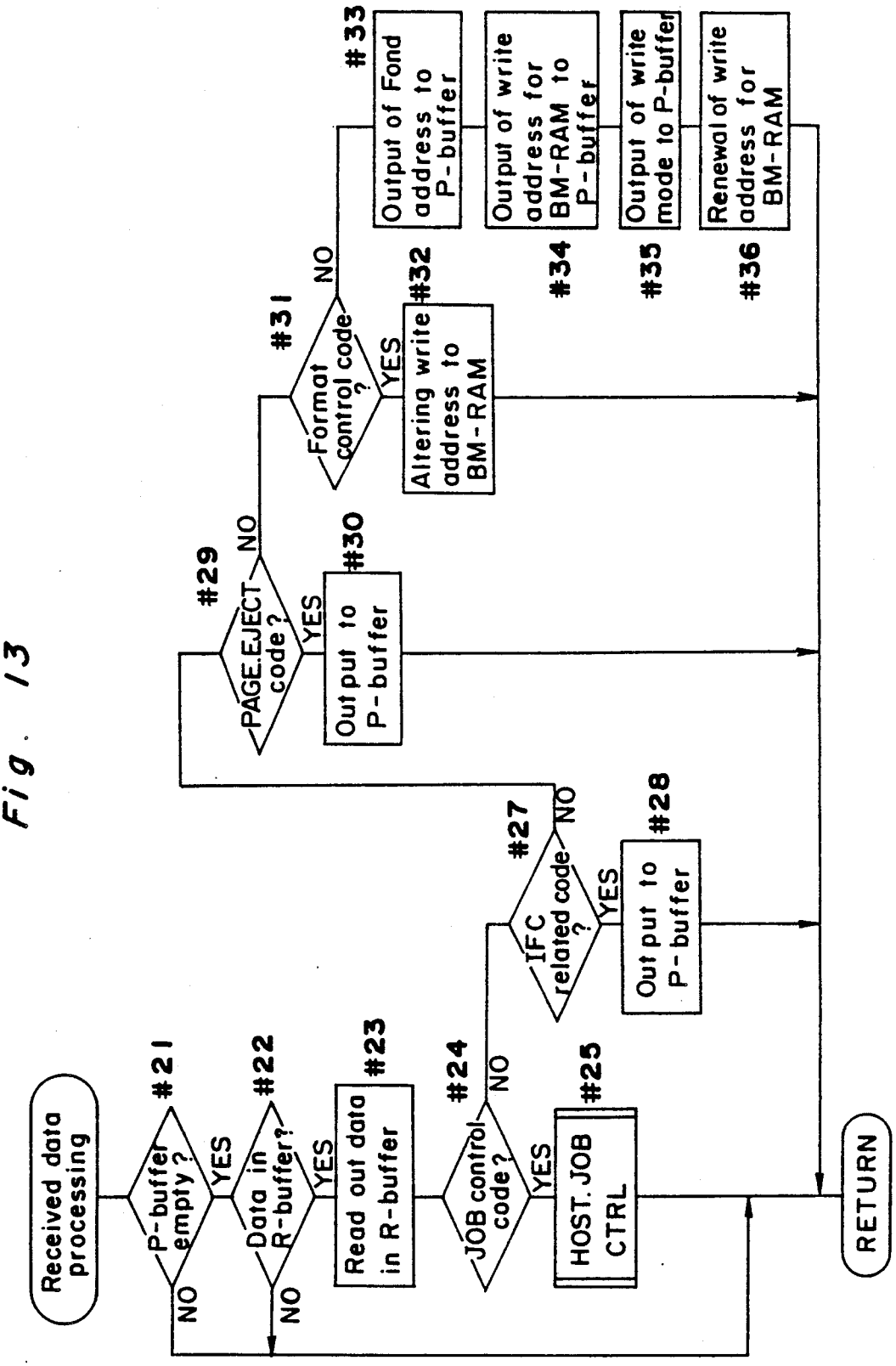

FIG. 13 shows a flow-chart of the processing received data.

In this processing, received data are transformed into packets beforehand which are convenient for outputting them to the bit map write means 31 and packets obtained are stored in P-buffer 305. This is intended to increase a through-put of data by transforming received data into packets in order for BM-RAM 32 parallel to a printing operation.

At first, it is confirmed at step #21 that there is an empty area in P-buffer 305, and, if data are received in R-buffer 304 (at step #22), data stored in R-buffer 304 are read out therefrom at step #23.

If received data are character codes to be printed (See steps #24, #27, #29, #31), they are transformed into packets according to an attribute of font having been read upon turning the power switch on (See steps #33 to #35). More precisely, a fond address of a pattern corresponding to a character code is outputted to P-buffer 305 at step #33, then, a write address to BM-RAM 32 is outputted to P-buffer 305 at step #34 and a write mode signal to the bit-map write means 31 is outputted to P-buffer 305 at step #35. And, finally, the write address of a pattern to BM-RAM 32 is renewed to next address determined according to a size of the present pattern at step #36.

As a receiving code, there is provided JOB control code for controlling the printer system 10 by the data processor 1. This code is processed in a subroutine HOST JOB CONTROL of step #25 (See FIG. 14).

If it is decided at step #27 that either one of codes related to IFC (Interface controller) which are used for setting a number of print, operation mode of an option and the like is received, a packet signal generated in a way different from that of character codes is outputted to P-buffer 305 in order to synchronize the processing for packets of characters (step #9) with the processing for IFC commands at step #28.

PAGE EJECT code (step #29) is a code for starting a print operation and the printer is started to operate when all characters existing prior to the code have been written into BM-RAM 32. The packet signal corresponding to this code is also outputted to P-buffer 305 at step #30 in order to synchronize the processing with the processing packets of character codes.

If the code received is one of format control codes (step #31), a write address to BM-RAM 32 is altered according to the code at step #32.

In the following, important subroutines will be explained.

Figure 14:
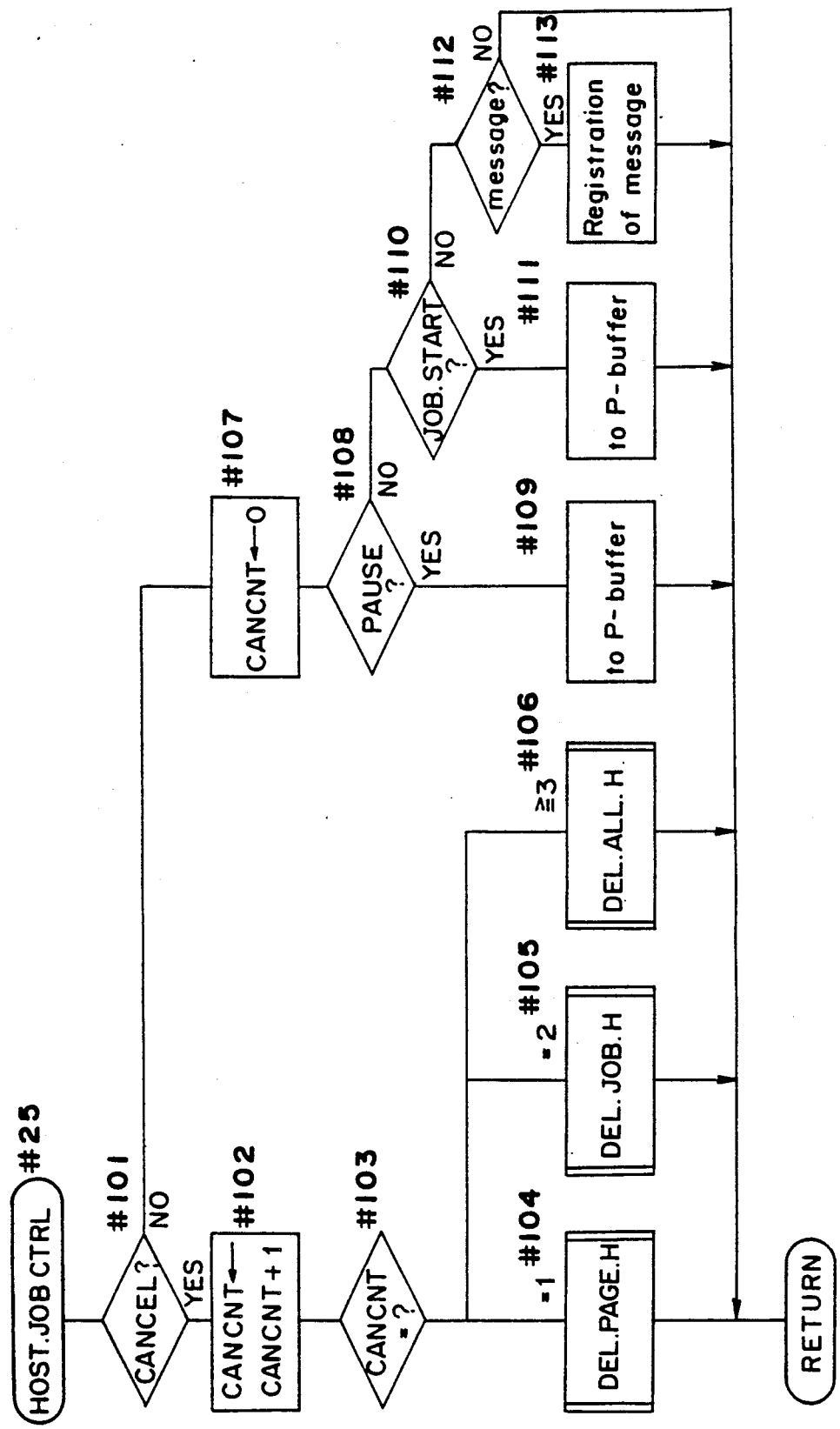

FIG. 14 is a flow-chart of a processing for JOB control codes sent from the data processor 1.

CANCEL codes indicates a suspension of printing. This suspension processing is differentiated according to a number of CANCEL codes sent from the data processor (See at steps #102 and #103).

When one CANCEL code is received for the first time, a print of the latest page received is suspended at step #104. This is done in the case wherein the print of the last page of a plurality of pages sent successively is to be suspended. Even if data regarding a plurality of pages are stored in R-buffer 304 or P-buffer 305, only the print of the last page is suspended.

When two CANCEL codes are received successively, a print of the last group of pages is suspended at step #105 (DEL. JOB. H). However, the print cannot be suspended about pages having been printed already. This is used in order to suspend or delete the last group of pages among groups of pages.

When CANCEL codes are received three times successively, a print of all pages is suspended at step #106 (DEL. ALL. H). This is used, for instance, in the case that a next print is demanded to start at once after initializing the print system 10 forcibly.

A counting of CANCEL codes is not done when a JOB control code other than the CANCEL code (at steps #101 and #107). Namely, the counter CANCNT is reset at that time.

As a JOB control code other than CANCEL code, there is provided a PAUSE code for pausing a print temporarily (See step #108). This is used to hold a pause state of the print even if data regarding the next page have been received already so as for the user to alter a mode of the print engine for printing a desired page manually. This code is input into P-buffer 305 in order to synchronize the processing thereby with a processing of the desired page at step #109. The pause of print is cancelled manually at the side of the print engine 4.

JOB START code is a code for indicating a partition between two successive groups of pages. This code is outputted to P-buffer 305 at step #111.

A message can be sent from the data processor 1 other than JOB control codes mentioned above at step #112. This message is a message for indicating a deletion of data toward the external which will be explained later. There are provided three kinds of DEL. P, DEL. J and DEL. A as messages. There are sent toward the external file buffer 2 or the data processor and can be registered through the data processor 1 according to a type of the external apparatus at step #113.

Figure 15:
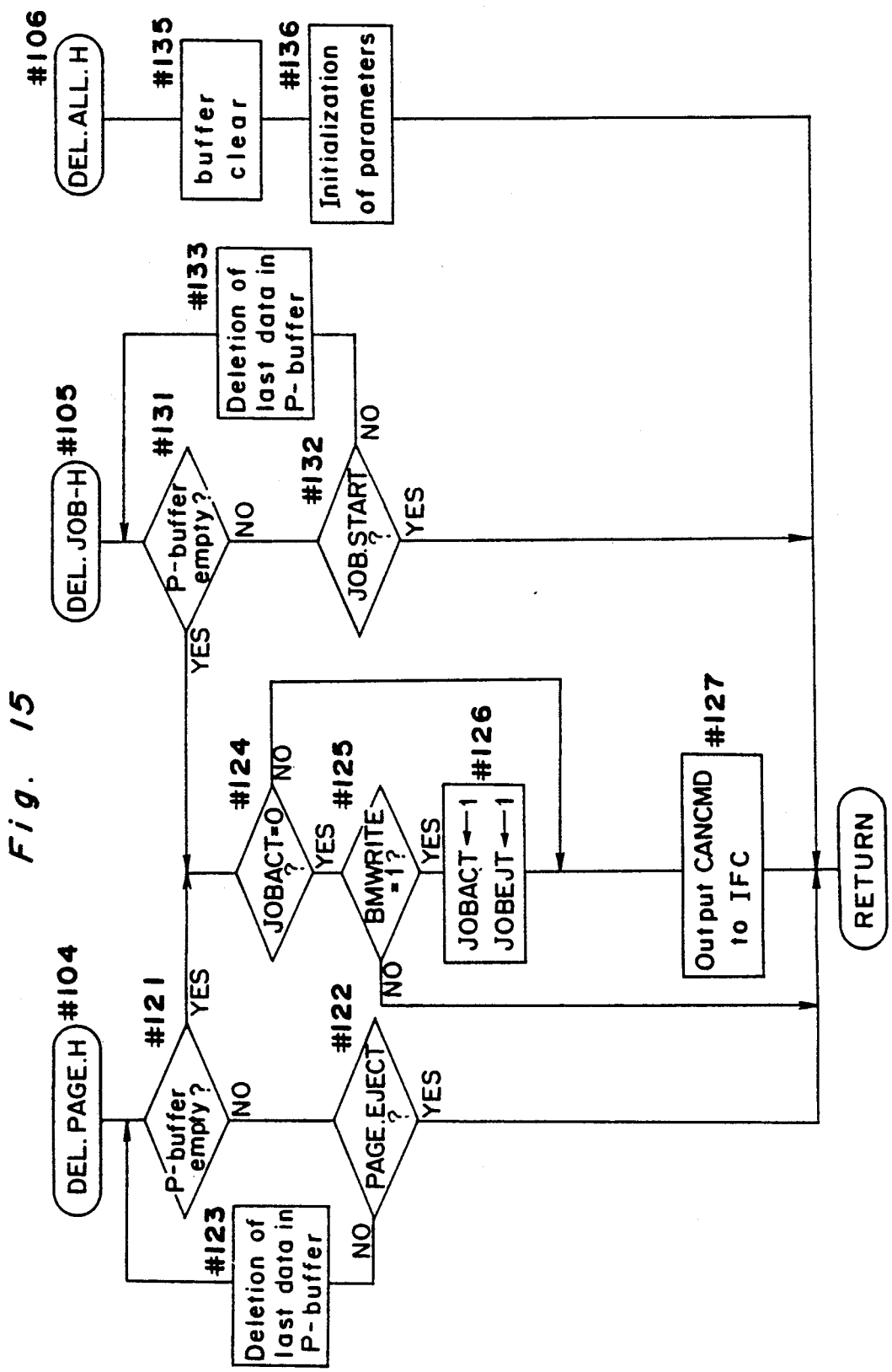

FIG. 15 shows a flow chart of a processing of print suspension in detail (#104 to #106).

As will be explained hereinafter, ranges of data of P-buffer 305 and R-buffer 304 to be deleted are determined by a JOB control code such as PAGE EJECT or JOB START code. If the JOB is DEL. PAGE. H (at step #104), only a page specified is deleted. If P-buffer 305 is not empty at step #121, the last packet in P-buffer 305 is deleted successively at step #123 until PAGE EJECT code indicating a partition of a preceding page is detected at step #122. When PAGE EJECT code is detected at step #122, the processing is ended.

When P-buffer 305 becomes empty at step #121 before detecting PAGE EJECT code, it means that the writing images into BM-RAM 32 has been completed.

If a printing was started already, a CANCMD command is outputted toward the interface controller at step #127 in order to suspend a multi-print operation and the process is ended. If neither the printer nor the image writing in BM-RAM 32 (BMWRITE=0 at step #125) are done, the process is ended at once since the printing has been completed.

If there are remained bit images in BM-RAM 32, a forcible discharge of a printing sheet is carried out as follows; at first, JOBACT and JOBEJT are set to "1" at step #126 for demanding a start of the printer and CANCMD is input to the interface controller 40 at step #127. Due to this, a print of one sheet is carried out regardless to a predetermined number of print set in the interface controller 40. This is done for discharging a sheet having been set prior to the print.

A job indicated by DEL. JOB-H is a job for executing suspension or deletion of the last group of pages through steps from #131 to #133. This job is similar to DEL. PAGE. H except that a code to be detected is JOB. START (at step #132). Accordingly, detailed description thereabout is omitted.

In a job of DEL. ALL. H (at step #106) P-buffer 305 is cleared at step #135 to delete all of pages. Further, internal parameters are initialized at step #136.

According to the present embodiment mentioned above, a job is selected based on a number of times of one code (CANCEL code). Due to this, the number of job code can be minimized. However, job codes corresponding to every job one to one can be assigned if there are enough control codes available to the data processor 1.

Processing commands in IFC

Figure 16:
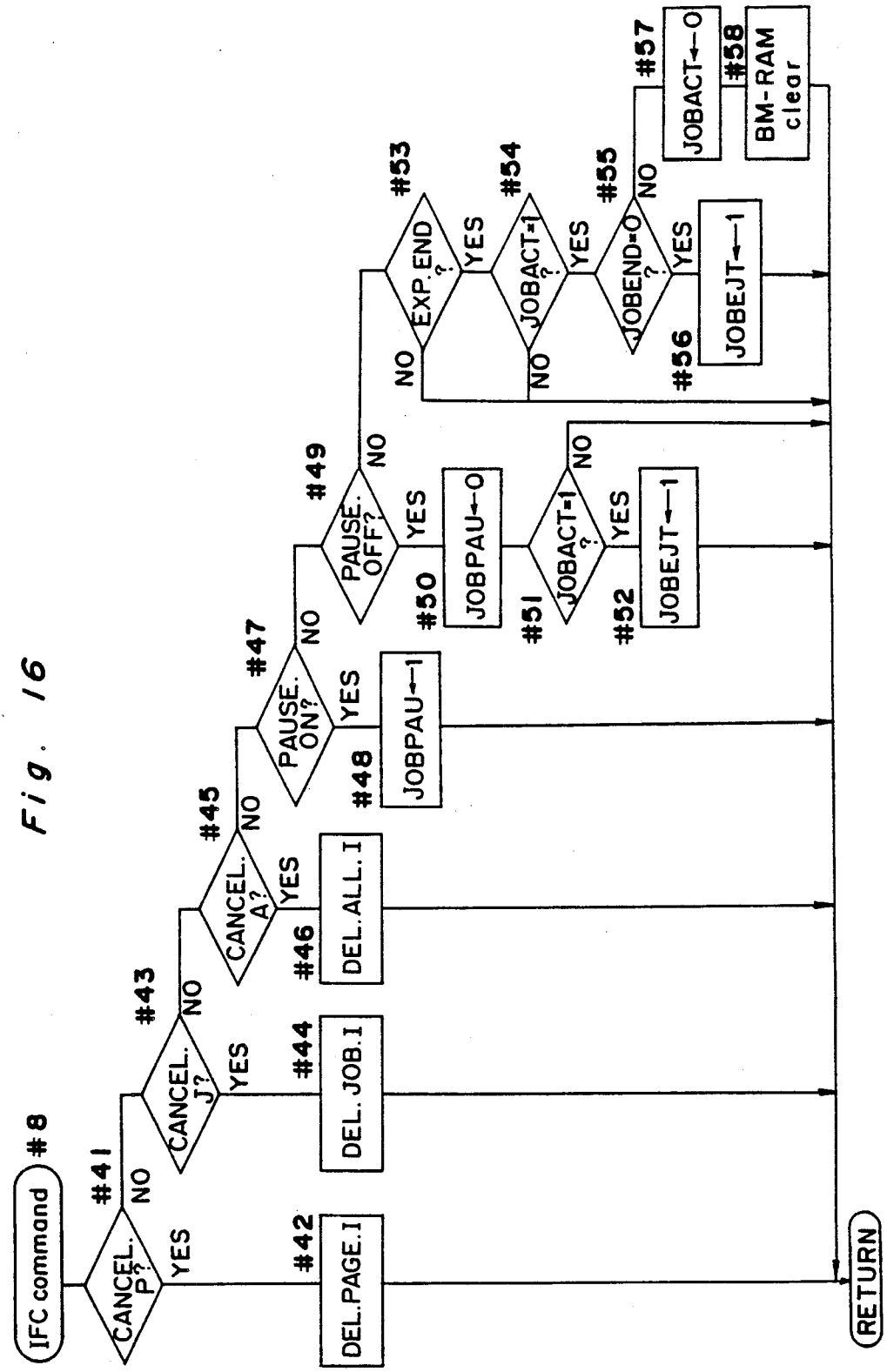
FIG. 16 is a flow chart for processing commands regarding to the interface controller.

FIG. 16 shows a flow chart of the subroutine #8 for processing commands in the interface controller wherein commands generated in the interface controller 40 according to key operations on the operation panel 44 are processed.

CANCEL. P command at step #41, CANCEL. J command at step #43 and CANCEL. A command at step #44 are provided for suspending a print operation at respective levels. Although details of each processing will be described later, briefly speaking, the job of DEL. PAGE. I (at step #42) is a job for suspending a print operation of a page on the way of printing, the job of DEL. JOB I (at step #44) is a job for suspending a print operation of a group of pages including a page being printed at the present time which is partitioned with a JOB. START code (See FIG. 18) and the job of DEL. ALL. I (at step #46) is a job for suspending a print operation with respect to all pages (See FIG. 19).

PAUSE. ON command of step #47 is provided for pausing a print operation and if it is detected, a flag of JOBPAU is set at step #48. The printer is really stopped according to the subroutine #10 of print control (See FIG. 21).

PAUSE. OFF command of step #49 is provided for starting the printer again. When it is detected, JOBPAU flag is reset at step #50 and, then, it is checked whether JOBACT flag showing a print mode is set at step #51. If so, JOBACT flag is set at step #52 which demands the start of the printer.

EXP. END command of step #53 is provided for synchronizing the interface controller 40 with the print sequence which indicates a completion of a print of one page by an exposure with use of a laser beam.

This command is effective only during a print operation. In the case of multi-print to an identical image, a next print-start flag is set in the BM controller 30 at that timing of the command. In the case of single-print or the last page of multi-print, JOBACT flag showing a print state is reset at step #57, BM-RAM 32 is cleared at step #58 for accessing a next image. Either one of processings of two kinds mentioned above is chosen according to a state of JOBEND flag corresponding to EXP. END command at step #55. This is based on the reason that a number of print in the case of multi-print is controlled by the interface controller 40.

As will be explained later, ranges of data of P-buffer 305 and R-buffer 304 are decided based on a JOB control code such as PAGE EJECT or JOB START. If there is not any JOB control code indicating a range of data to be deleted in P and R-buffers 305, 304, either one of messages for indicating deletion of data is transmitted to the external device at step #155 in FIG. 17, #175 in FIG. 18 or #186 in FIG. 19.

Figure 17:
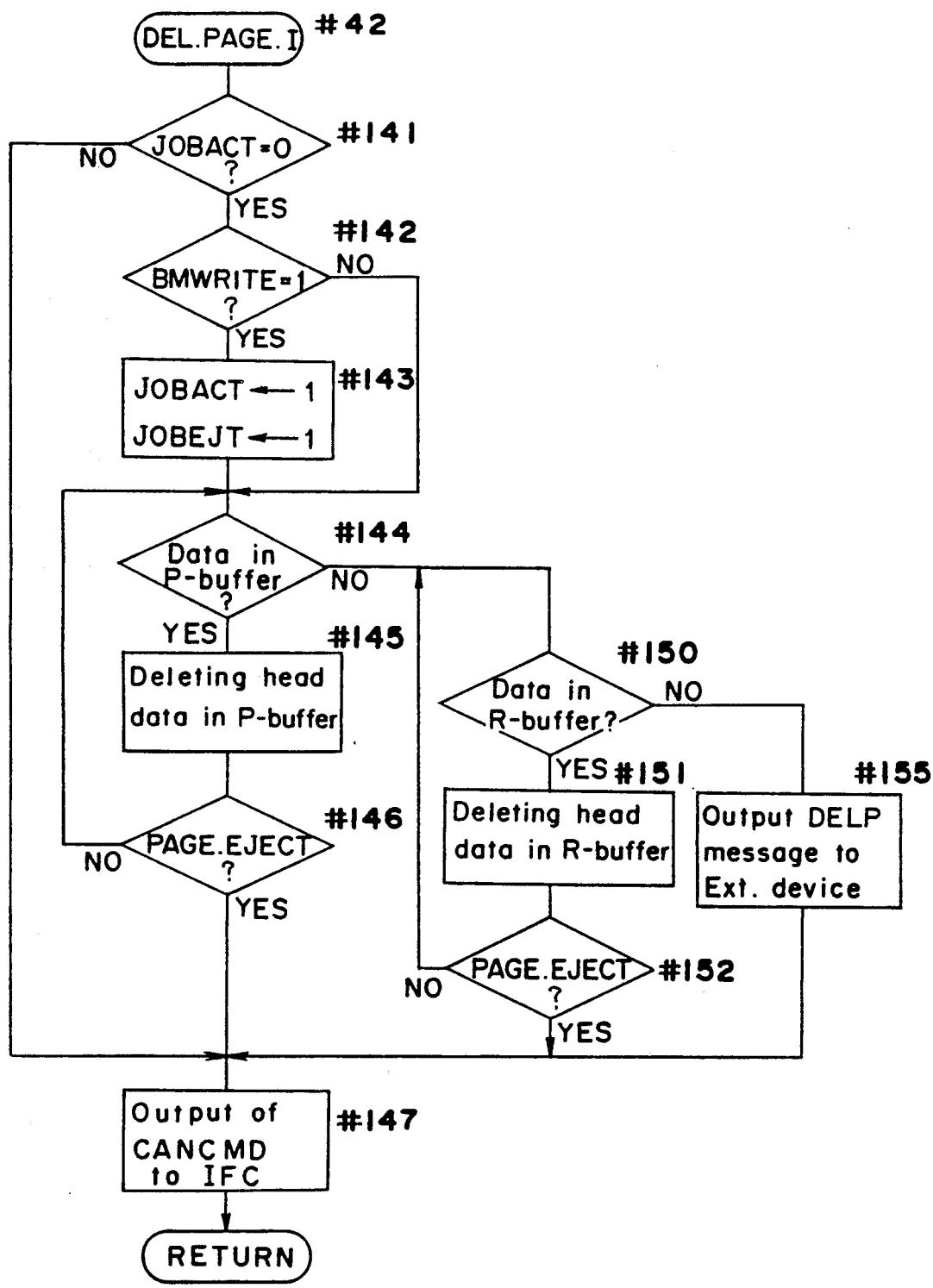
FIGS. 17 to 19 are flow charts for showing processings about commands in the interface controller, respectively.
Figure 18:
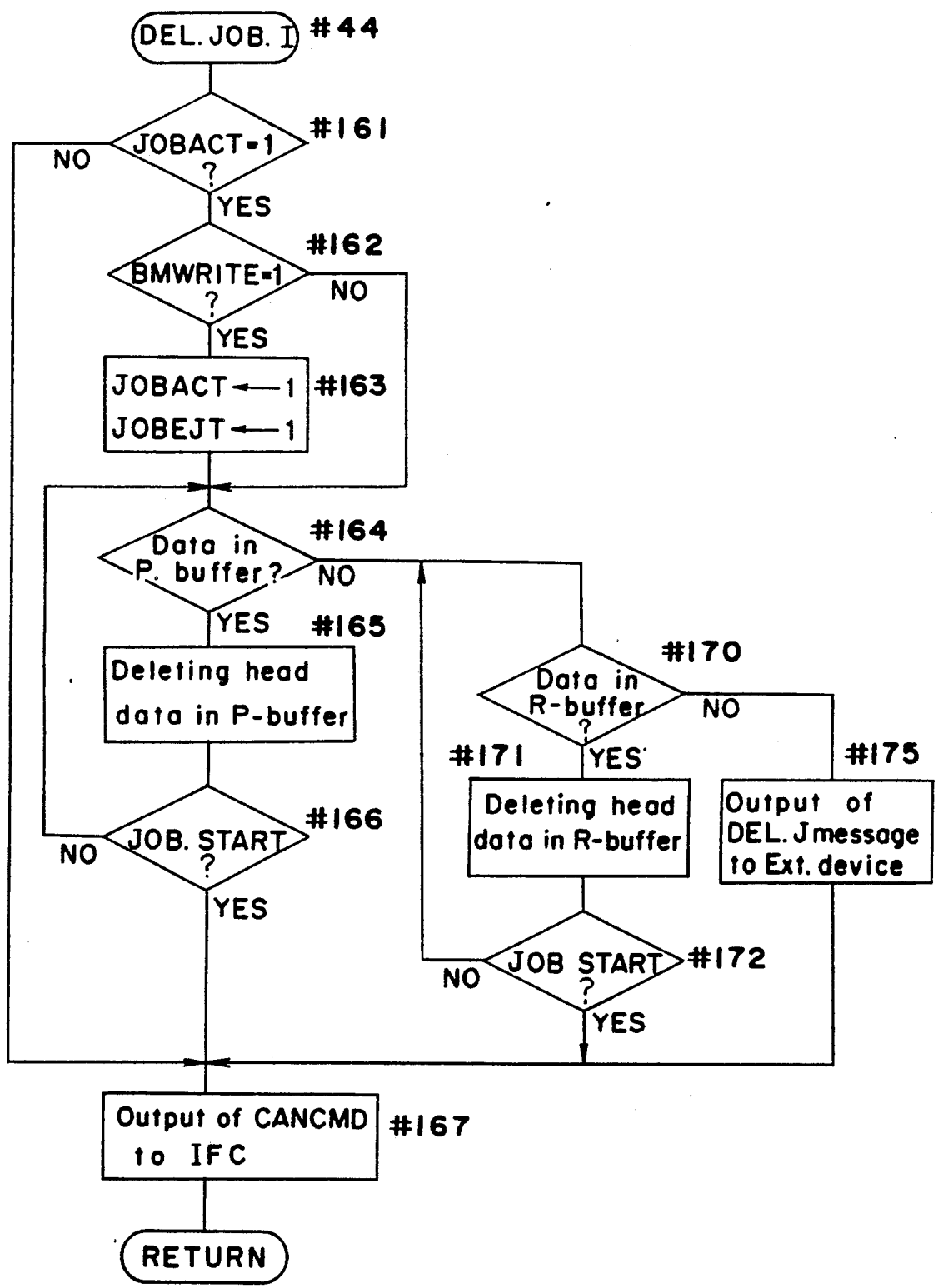
Figure 19:
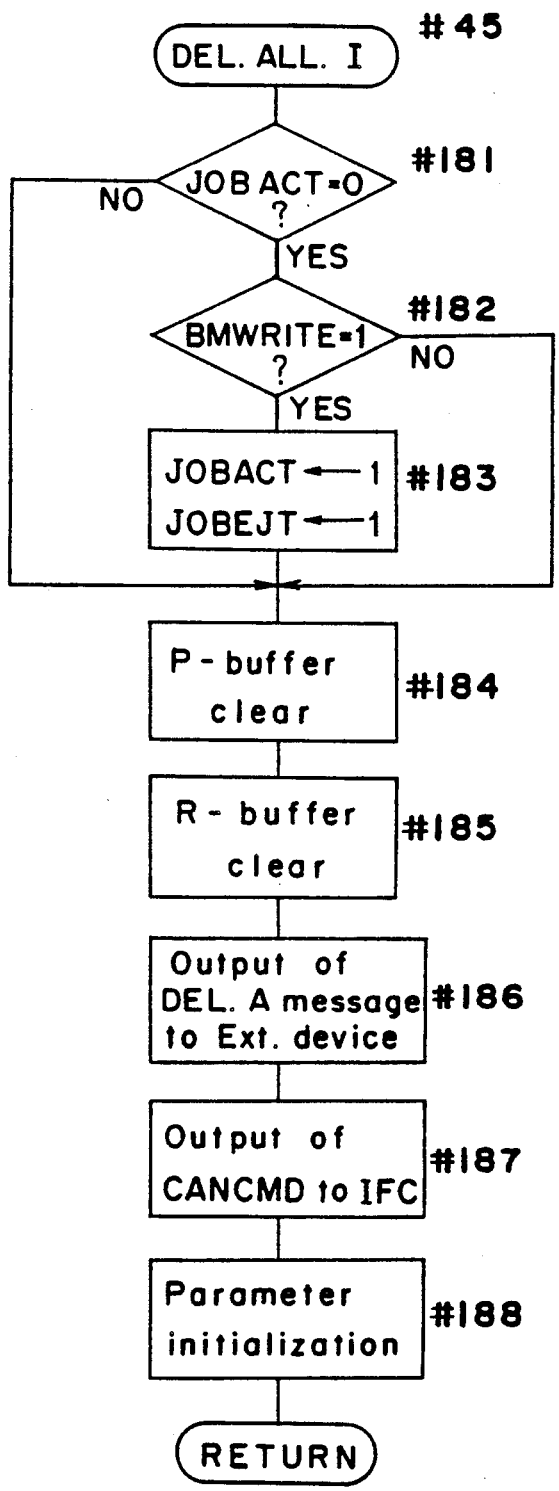

FIGS. 17 to 19 show details of the processing for the suspension of print operation according to a key entry through the operation panel 44.

A job flow of DEL. PAGE. I (step #42) shown in FIG. 17 is provided for suspending a print operation of a page being printed at the present time.

If the print operation is carried out at the present time (JOBACT=1), the process is skipped to step #147 to output CANCMD code toward the interface controller 40 which indicates the suspension of multi-print.

In the case wherein some images are formed in BM-RAM 32 (BMWRITE=1 at step #142) but the printer is not in a printing state, at step #143, the state flag of print JOBACT is set to "1" and the command JOBEJT commanding the start of the printer is set to "1" in order to discharge a sheet having been fed to a print start position in advance.

Further, packets from the top to PAGE EJECT code in P-buffer 305 are deleted in order to delete residual data of the corresponding page at steps #144 and #145. If packets are deleted until PAGE EJECT code (YES at step #146), CANCMD code is outputted to the interface controller 40 in order to limit a number of print at this time to one at step #147.

If there is not PAGE EJECT code in P-buffer 305 at step #144, data in R-buffer are deleted from the top to PAGE EJECT code since data corresponding to the present page are retained in R-buffer 304 (step #150, #151 and #152). When data are deleted until PAGE EJECT code at step #151, CANCMD command is outputted to the interface controller 40 at step #147. If there is not PAGE EJECT code also in R-buffer 304 (NO at step #150), a message DEL. P for indicating a deletion of page is outputted to each of external devices at step #155 since the external file buffer 2, a transmission buffer in the data processor 1 or the data processor itself is in an output mode. This message can be set according to a specification of each external device through the data processor beforehand. Then, CANCMD is outputted to the interface controller 40 at step #147.

A job of DEL. JOB. I (step #44) shown in FIG. 18 is provided for suspending a print of one group of pages including a page being printed at the present time. Basic idea of this processing is same to that of DEL. PAGE. I.

Differences between DEL. JOB. I and DEL. PAGE. I are as follows; data are deleted until JOB. START code in DEL. JOB. I (at steps #166 and #172) contrary to DEL. PAGE. I wherein data are deleted until PAGE. EJECT code and a message to the data processor 1 is changed to DEL. J (at step #175) which demands the deletion of one group of pages.

A job of DEL. ALL I (step #45) shown in FIG. 19 is a processing for executing a deletion of all pages. Although the deletion of the present page is decided according to the print state and the state of BM-RAM 32 similarly to the case of DEL. PAGE. I through steps #181 to #183, all data stored in P-buffer 305 and R-buffer 304 are deleted at steps #184 and #185. Further, a message DEL. A. which indicates the deletion of all pages is outputted to the data processor at step #186 and, to the interface controller 40, CANCMD is outputted at step #187. Further, at step #188, internal parameters are initialized.

Packet Processing

Figure 20:
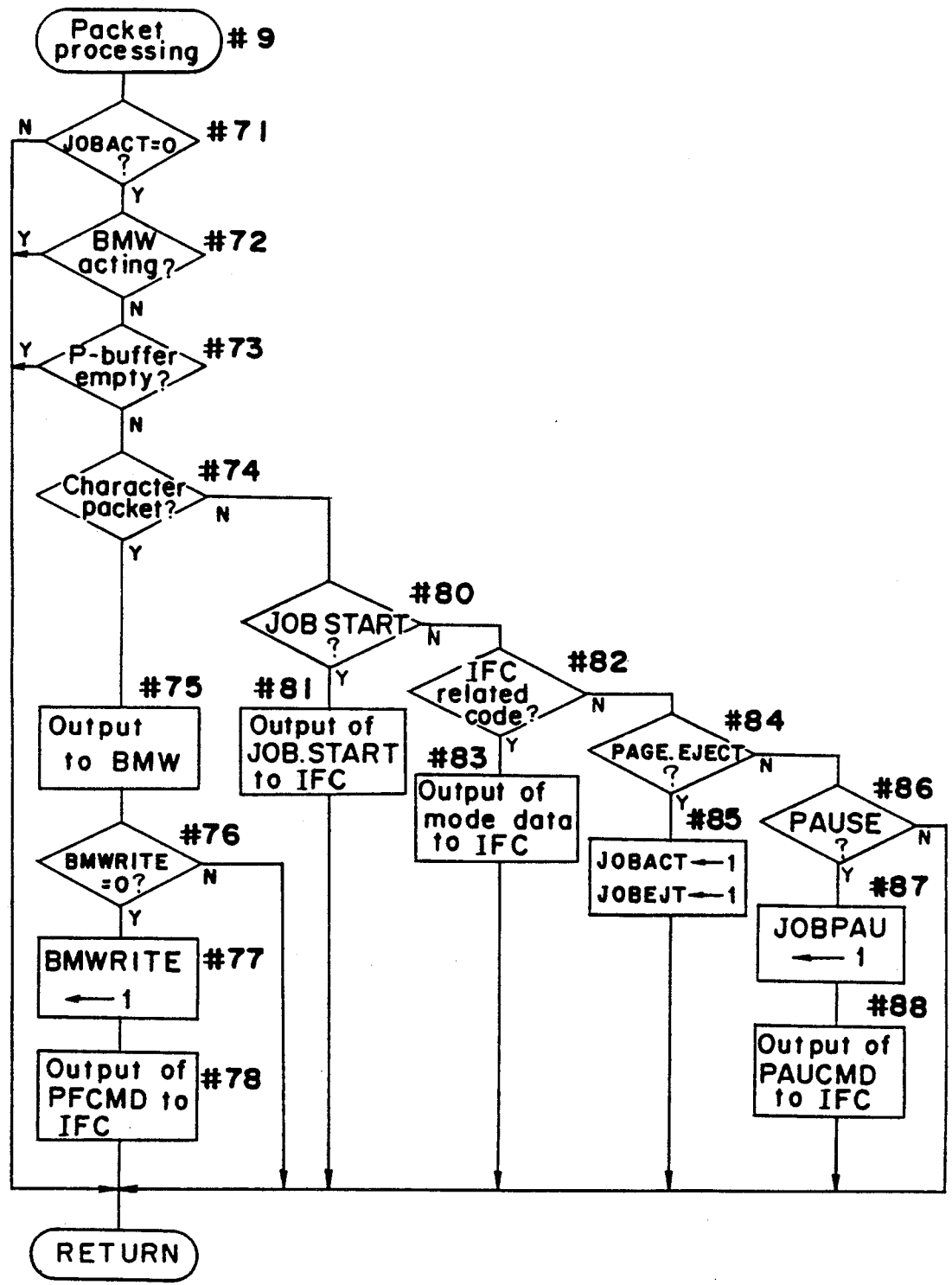
FIG. 20 is a flow chart for processing packets.

In the packet processing shown in FIG. 20, packets stored in P-buffer 305 are processed. As mentioned above, there are two groups among packets used. One group is provided for character codes and the other is provided for control codes. Since the renewal of BM-RAM 32 cannot be done before completing a print out of a preceding image, no processing is done in the print state of the printer (JOBACT=1) (step #71). Also, in the case wherein the bit map write means 31 is in a state of writing a character corresponding to a preceding packet (at step #72) or in the case wherein P-buffer is empty (at step #73), any processing is not done.

If the packet to be processed is a character packet at step #74, it is outputted to the bit map write means 31 at step #75. In the bit map write means 31, the packet is analized and a character pattern identified according to a font address obtained is read out from the font means 33 to form a bit image in BM-RAM 32. While processing one packet, processing of a next package is forbidden at step #72.

If the character is first one (BMWRITE=0 at step #76), BMWRITE flag is set at step #77 and, at step #78, PFCMD command for demanding a feed of sheet beforehand is outputted to the interface controller 40. Since feeding operation of a sheet and processing packets are done parallel, through-put of data is improved.

Control code packets other than character code packets are processed as follows.

If the packet is JOB.START (step #80), indicating a partition between two groups of pages, it is outputted to the interface controller 40 in order to initialize the mode of the print engine 4 for a new group of pages at step #81.

If the packet is IFC relation code (step #82) which is used for designating a number of sheets to be multi-printed and/or an operational mode of an optional device, it is outputted to the interface controller 40 at step #83.

When PAGE. EJECT is received indicating a partition between two pages at step #84, images having been formed in BM-RAM 32 before receiving PAGE. EJECT are outputted to the print engine 4.

In order for that, JOBACT flag is set to inhibit imaging to BM-RAM 32 thereafter and JOBEJT flag is set in order to demand the start of the printer at step #85. The latter flag JOBEJT is checked at step #91 in FIG. 21 showing a flow chart of PRINT control in order to output PRNCMD as a print command to the interface controller 40.

When PAUSE for pausing the print operation temporarily at step #86, is received JOBPAU flag is set at step #87. Due to this, a next start of print is suspended in the print control routine (See FIG. 21). Further, it is outputted to the interface controller at step #88. The printer is started again if PAUSE OFF is outputted from the interface controller 40.

Print Control

Figure 21:
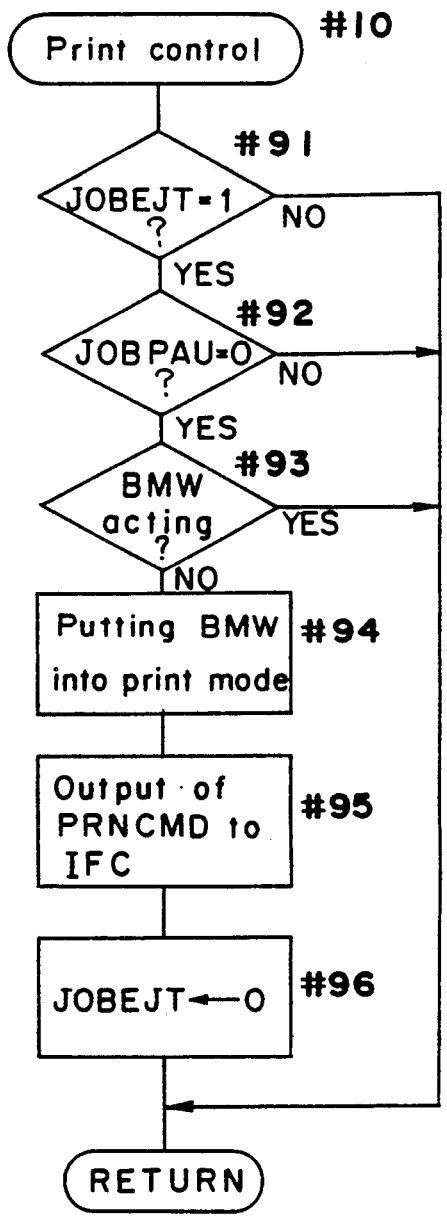
FIG. 21 is a flow chart of a print control processing.

In the print control routine shown in FIG. 21, the printer is started according to states of JOB control flag (JOBEJT and JOBPAU) and the state of the bit map write means 31.

The printer is started usually when JOBEJT flag is set to "1" (step #91). However, when JOBPAU flag is set to "1" (step #92) or the bit map write means 31 is processing the last packet (step #93), the printer cannot be started.

If the printer is in a state ready for start, the bit map write means 31 is switched to the print mode at step #94, PRNCMD code is outputted to the interface controller 40 at step #95 and JOBEJT flag is reset at step #96.

Demand for Interruption

Figure 22:
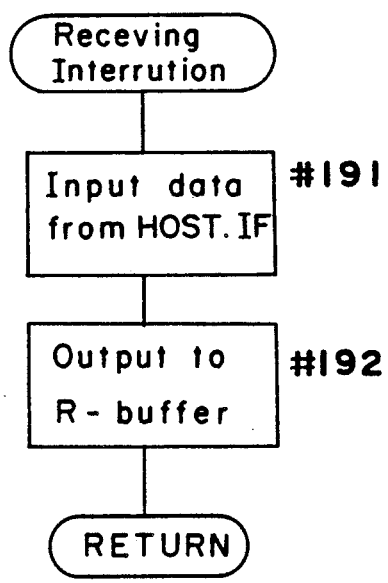
FIG. 22 is a flow chart of an interruption routine for processing data, received from the external device.

A flow chart shown in FIG. 22 is an interruption process to be executed when a transmission of data is requested by the interface 308 of the data processor 1. In this process, data sent from the data processor 1 are received at step #191 and outputted to R-buffer 304 at step #192. Output to the data processor 1 is not done in this interruption routine and is done directly when needed.

In the preferred embodiment, data received are transformed into packets once and, then, those packets are outputted to P-buffer 305. However, if the processing time is not important, data received can be outputted to P-buffer 305 directly and transformed into packets upon writing to BM-RAM 32.

(d) Flow of Interface Controller

Figure 23A:
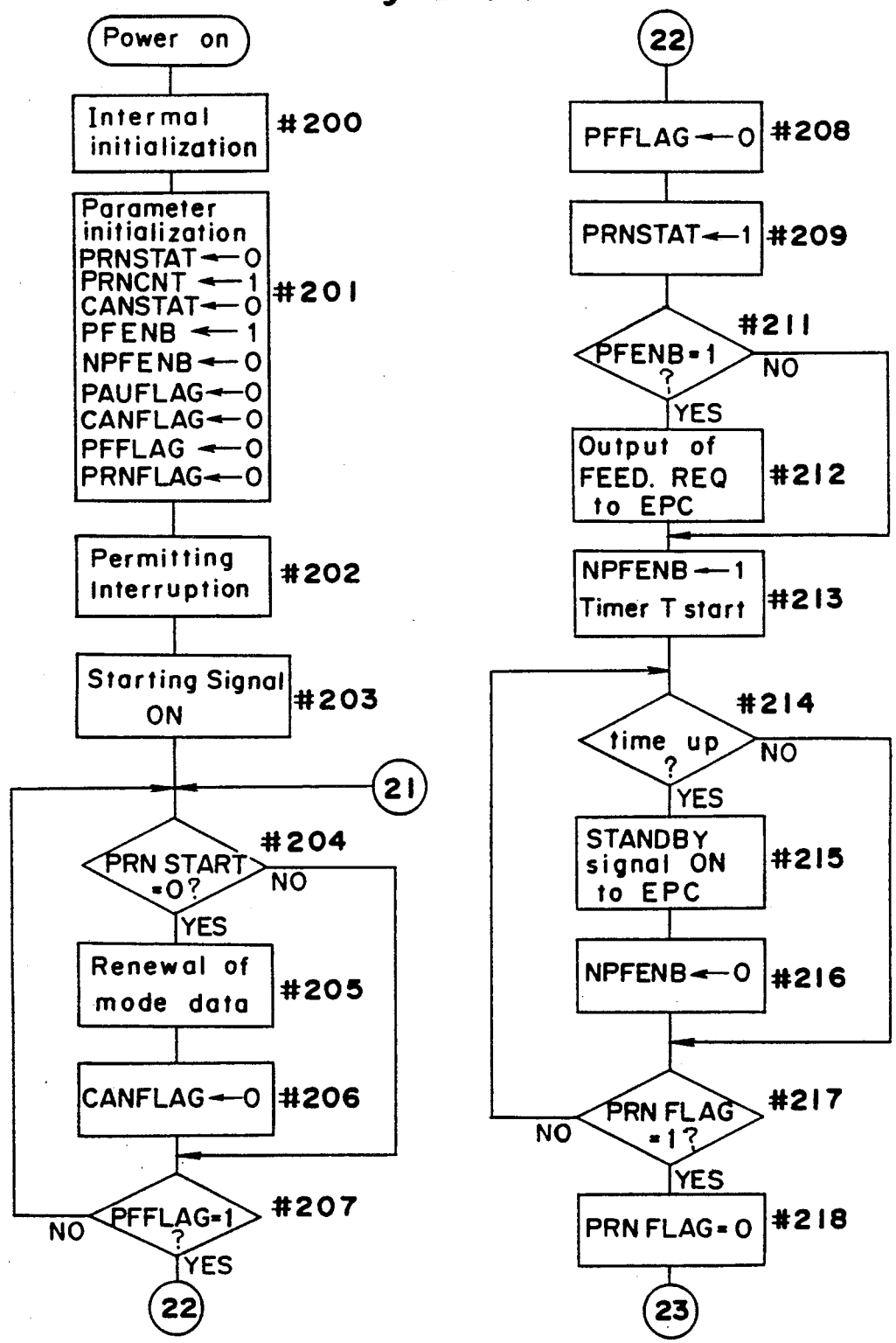
FIGS. 23(A), 23(B), 24, 25(A) and 25(B) are flow charts showing processings in the interface controller, respectively.
Figure 23B:
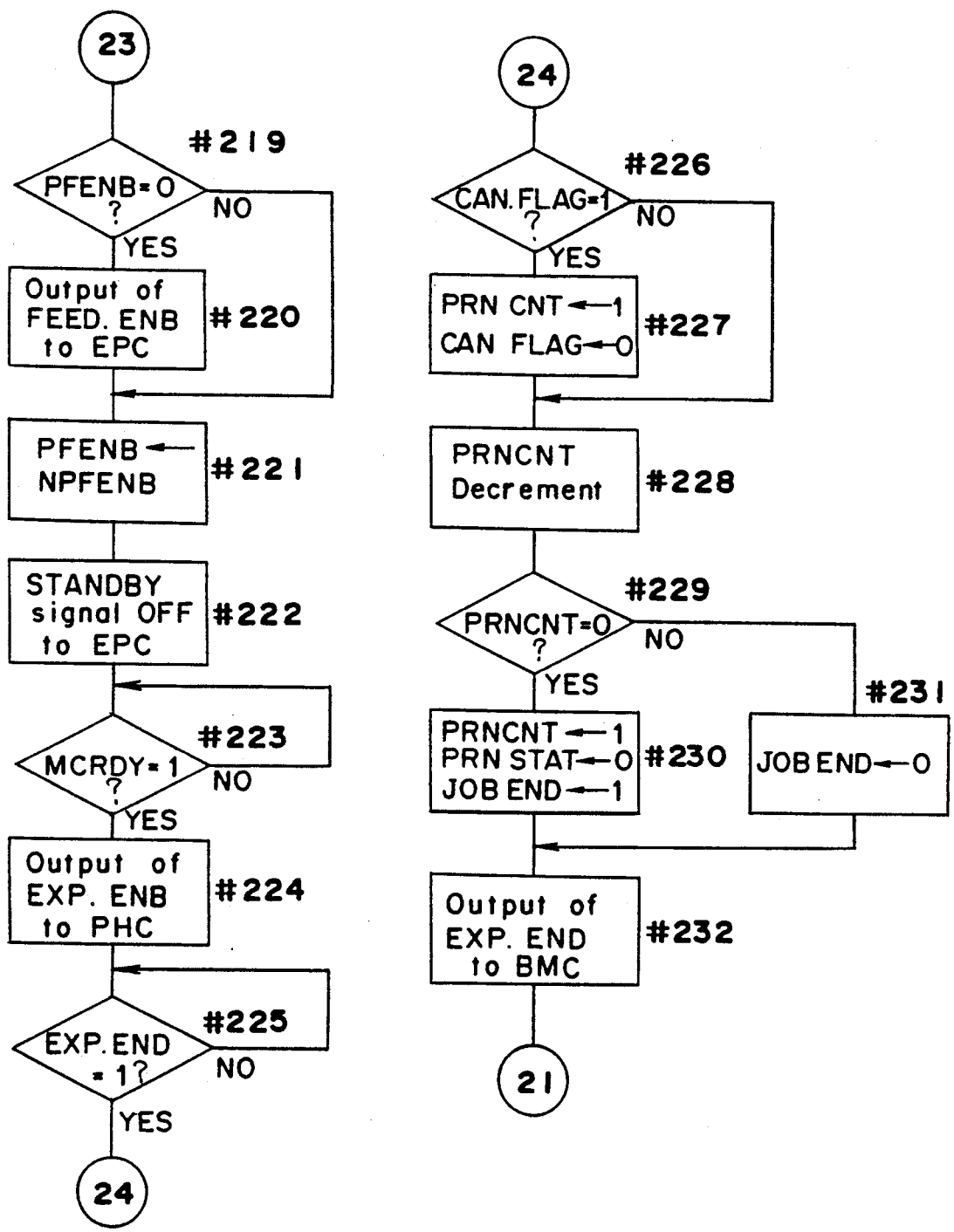

FIG. 23 shows a flow chart to be executed by the interface controller 40.

When the power switch of the system is turned on, the interface controller 40 is initialized internally at step #200 and parameters are initialized at step #201. Functions of these parameters are as follows;

PRNSTAT indicating a printing state of a certain page,

PRNCNT a number of sheets to be printed with respect to a certain page,

CANSTAT indicating a range of data to be deleted according to CANCEL function,

PFENB allowance of a pre-set of a sheet for a next print,

PAUFLAG indicating a state of PAUSE key,

CANFLAG indicating a fact that CANCMD code from the bit map controller 30 is detected, PFFLAG indicating a fact that PFCMD code from the bit map controller 30 is detected, PRNFLAG indicating a fact that PRNCMD code from the bit map controller 30 is detected.

After the initialization of these parameters, two interruption processes are permitted at step #202 and, at step #203, start signals are outputted to the sorter 6, the external sheet feeding unit 5, the electro-photographic controller 42 via the bus B5 to enter a processing loop. As to interruption routines mentioned above, there are provided an interruption by the bit map controller 30 for receiving commands outputted therefrom and an interruption by the system timer for executing the control of the operation panel 44.

Before entering into an explanation of the processing loop, two interruption processes are explained.

Figure 24:
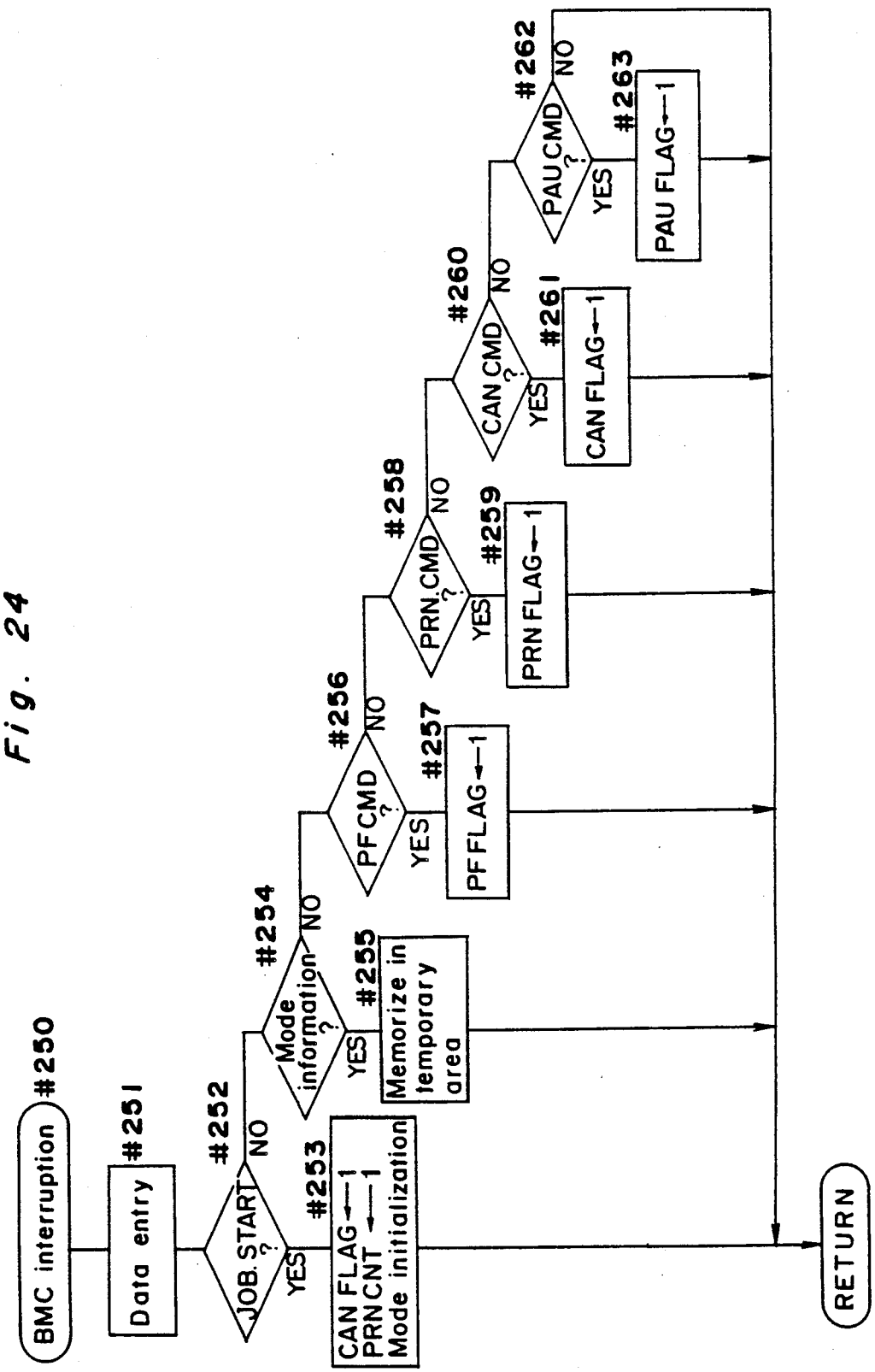

FIG. 24 shows a flow chart of the interruption routine by the bit map controller. In this BMC interruption, commands sent from the bit map controller 30 are received to process these. The command received is not executed directly in this routine but an internal flag provided in the interface controller is set according to the command. The real processing thereabout is executed when the flag having been set is found. This is intended to simplify the processing loop by asynchronizing communications between the processing loop and the bit map controller 30.

Further, information about individual modes of the printer and the optional devices are stored in an area provided for memorizing those temporarily at step #255 and memorized informations are utilized in the real processing loop.

Each command is so processed as to set a flag corresponding thereto usually in the bit map control interruption (See steps #252, #253, #256∼#263). But, in the case of JOB.START indicating a partition between two groups of pages, (step #252), CANFLAG is set to "1" at step #253 similarly to the case of CANCMD (step #260 and #261). JOB. START is sent to partition between two groups of pages after the completion of the foregoing groups of pages. Accordingly, PRNCNT indicating a number of print is set to "1" and individual modes are reset or initialized to initial modes or standard modes at step #253. CANCMD is disregarded when the printer is not in a print state (PRNSTAT=0).

Figure 25A:
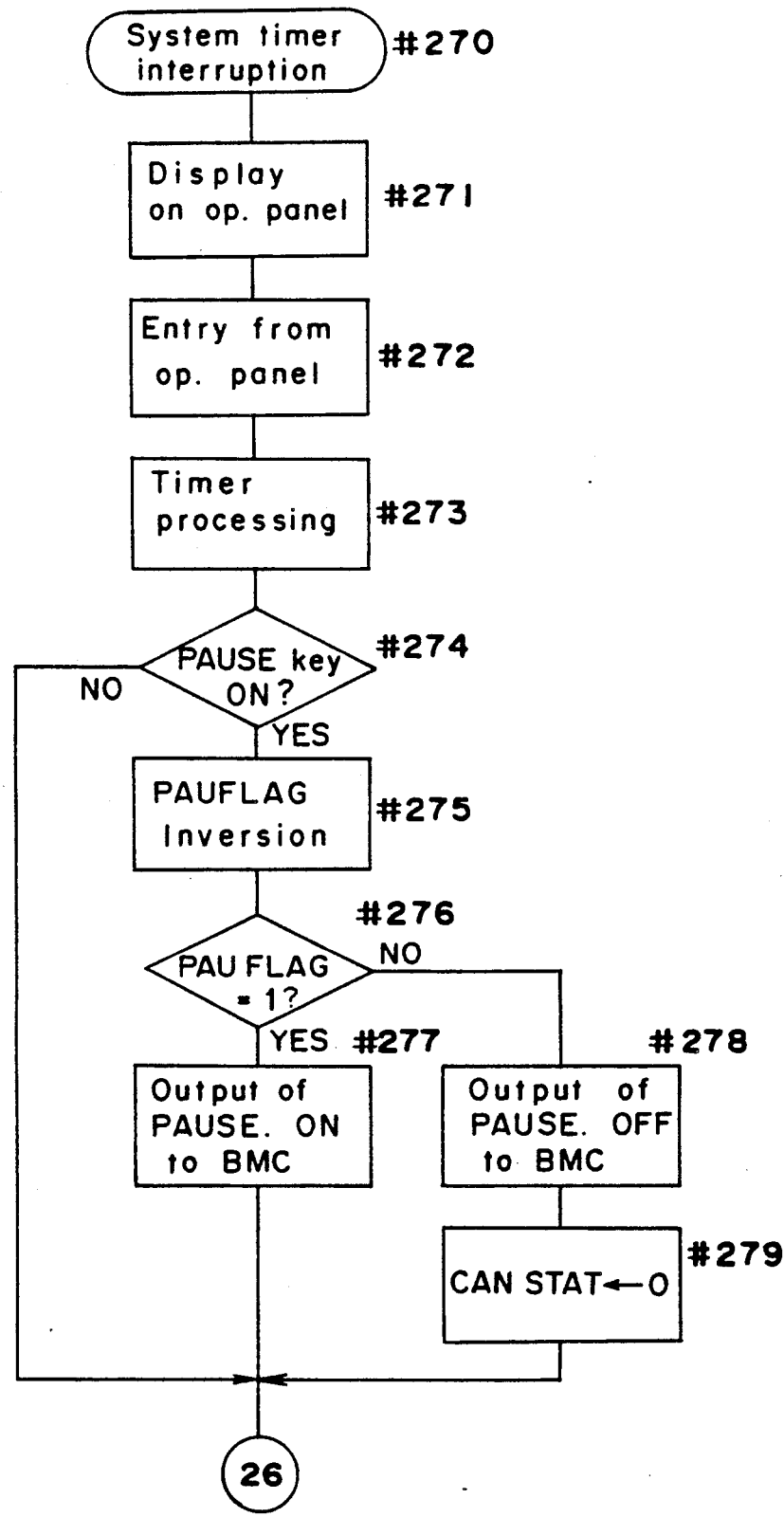
Figure 25B:
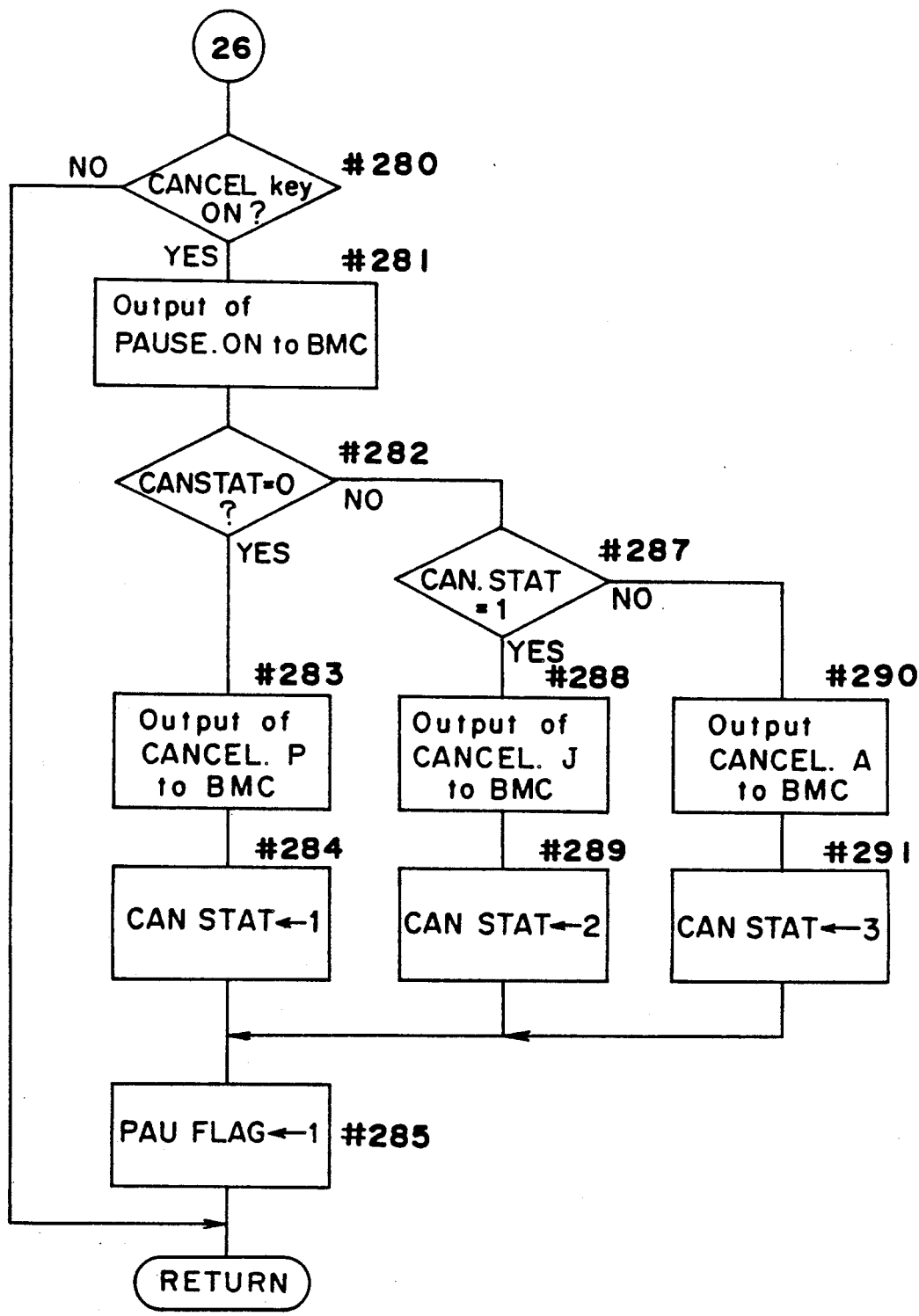

FIG. 25 shows a flow chart of the system timer interruption. In this interruption, an input-output processing for the operation panel 44 (steps #271 and #272), a counting of a timer defined in the processing loop (step #273) and a processing according to a key operated are executed. Herein-below, the processing about PAUSE key 901, and CANCEL keys 902 and 903 will be explained.

PAUSE key 901 is provided for demanding a pause of the printer or another start of the printer. Every time when it is operated, the function is switched from the pause to another start or vice versa. Namely, when the PAUSE key is operated at step #274, PAUFLAG is inverted at step #275 and the function is determined according to a value of PAUFLAG at that time. For instance, since PAUFLAG is reset just after the power-on, when PAUSE key is operated for the first time, PAUFLAG is set to "1" which demands a pause of the printer and, at step #277, PAUSE ON signal is outputted to the bit map controller 30. Contrary to the above, when PAUFLAG is reset to zero, PAUSE. OFF signal is outputted to the bit map controller at step #278. Further, at step #279, the functional level of CANCEL key is returned to zero-level (CAUSTAT=0).

When the bit map controller 30, detects PAUSE.ON, it prohibits the next print (See step #92 in FIG. 21).

CANCEL key is provided for demanding a suspension of the printing operation through the operation panel 44. The level of suspension is differntiated according to a number of times of successive operations of CANCEL key. When the suspension is demanded once, the printer is paused similarly to PAUSE key.

Three levels are provided as follows;
Level 1: Suspension with respect to a page being printed at the present time.
Level 2: Suspension with respect to a group of pages including a page being printed at the present time.
Level 3: Suspension with respect to all groups.

When CANCEL key is operated at step #280, PAUSE.ON is outputted to the bit map controller 30 to suspend the printing operation at step #281 and, then, the processing is executed according to a level corresponding to a number of times of operations of CANCEL key.

When CANCEL key is operated for the first time (CAN STAT=0 at step #282), CANCEL.P is outputted to the bit map controller 30 at step #283 and CAN STAT is renewed to "1" at step #284. Further, PAU FLAG is set at step #285 since the printer is paused temporarily.

If CANCEL key is operated twice (CANSTAT=1 at step #287), CANCEL.J is outputted to the bit map controller 30 at step #288, CANSTAT is renewed to "2"at step #289 and PAUFLAG is set at step #285. If CANCEL key is operated three times or more (CANSTAT=2 or more at step #287), CANCEL.A is outputted to the bit map controller 30 at step #290, CANSTAT is renewed to "3"at step #291 and PAUFLAG is set at step #285.

The printer being put into a pause state by the operation of CANCEL key is restarted by the operation of PAUSE key.

In this preferred embodiment, either one of a plurality of suspension modes is designated by the number of times of operations of an identical key (CANCEL key). Therefore, other keys are available for other functions. However, if the operation panel 44 can have enough keys, different keys or different combinations of keys can be assigned to individual suspension modes.

Now returning to FIG. 23, the processing loop will be explained.

If PRNSTAT is equal to zero at step #204, a number of times of print and mode informations about optional devices are renewed at step #205. It is to be noted that the renewal of these data are done only after sheets of the predetermined number have been printed about a foregoing page (PRNSTAT=0). At the same time, CANFLAG is reset at step #206.

This processing is repeated until PFFLAG has been set by the pre-feed command PFCMD outputted from the bit map controller 30 (step #207). When PFFLAG is set, the flag is reset at step #208 and the flag for the state of print PRNSTAT is set to "1" at step #209.

When the pre-feed command PFCMD is received, a signal FEEDREQ of feed-request of a sheet is outputted to the electro-photographic controller 41 via the bus B5 at step #212 if the pre-feed of sheet is permitted at step #211. Due to this, the electro-photographic controller 41 makes the electro-photographic processor 45 start for feeding a sheet and printing it. The sheet thus fed is held in a waiting state at a predetermined position. If the external feeding unit 5 is designated, the feeding of a sheet is done by said unit 5. In this case, the waiting position of the sheet is same to that of the former case. And, the interface controller 40 checks conditions for a pre-feed of sheet at the next print. In order for that, it sets NPFENB flag indicating the permission of the pre-feed of sheet to "1" temporarily and starts a predetermined timer T at step #213. This timer has two functions. The first one is such a function as to put the print engine 4 in a stopped state (waiting mode 2) by sending STANDBY signal to the electro-photographic controller 41 when the time set in the timer T has been passed (steps #214, #215). This is done for preventing wear of a photo-sensitive drum and individual parts in the electro-photographic processor which might be caused when the operational mode thereof is kept for a long time in such a state as when it takes a long time to form bit map images in the BM-RAM 32 by the bit map controller 30 or a case that a transmission time by the data processor becomes long.

Another function is to inhibit a pre-feed of sheet at the next print by resetting NPFENB indicating a permission of the next pre-feed of sheet. The advantage being that wear of the individual parts of the electro-photographic processor are reduced by keeping the mode thereof unchanged, since there exists such a high possibility that images of same kind are printed usually in one group of pages. Although it may be considered that the through-put of data is decreased according to this method, a sheet is pre-fed at the next print since NPFENB is kept in the set state, when the print command PRNCMD has been input upon the next print before the time up of the timer T, even if the pre-feed of sheet was inhibited once. Accordingly, these functions of the timer T contribute to improve the through-put and to reduce possible wear of individual parts of the electro-photographic processor 45.

When the interface controller 40 detects that PRNFLAG is set equal to "1" at step #217 which indicates a receipt of the print command PRNCMD, it outputs FEEDREQ for requesting a pre-feed of sheet at step #220 after resetting PRNFLAG to zero at step #218 and renews PFENB flag for the next print at step #221. Further, at step #222, it turns STANDBY signal off, namely, releases the wait-mode 2 and, when MCRDY signal is sent from the electro-photographic processor 45 at step #223 which indicates that image processing portions of the electro-photographic controller 41 become stable, outputs EXPENB signal indicating a permission of an exposure to the print head controller 42 at step #224. After these steps, a real exposure is made by the print head controller 42.

When the exposure is completed, the print head controller 42 outputs EXPEND signal. And, if it is detected at step #225, the print head controller 40 proceeds to control a number of times of print regarding to each page.

Though the number of times of print is determined usually according to mode informations transmitted from the bit map controller 30, if it is requested through the operation panel or the bit map controller 30 to suspend the print, the print is ended when the print of the sheet being printed at that time has been finished. The suspension of print is checked by the state of CANFLAG at step #226. If CANFLAG is set equal to "1", a remaining number of sheets to be printed including the sheet having been printed at that time is set equal to "1" (PRNCNT=1) and CANFLAG is reset at step #227. Then, the rest number of sheets to be printed is decremented at step #228 including the ordinal print mode and it is checked at step #229 whether it becomes equal to zero (PRNCNT=0).

If the print regarding to a relevant page is not finished (PRNCNT≠0), JOBEND flag is reset at step #231. At step #232, EXPEND is outputted to the bit map controller 30 to indicate the finish of the exposure at this time. Then, the process is returned to the beginning of the processing loop to wait for the next print.

If a multi-print is finished (PRNCNT=0 at step #229), the temporary number of times of the print is set to equal "1" (PRNCNT=1), PRNSTAT is reset to zero to end the printing mode (PRNCNT=0) and JOBEND flag is set at step #230. Then, EXPEND is sent to the bit map controller at step #232 in order to indicate that a number of times of exposure is set with respect to an image of this time.

The interface controller 40 executes controls regarding to communications in the print engine 4 other than controls mentioned above. Namely, it communicates data with individual controllers via the bus B5 and has a role for interconnecting between two controllers. However, these functions are not related to the subject matter of the present invention and, therefore, explanations about those are omitted here.

(e) Flow of Electro-photographic control

Figure 26A:
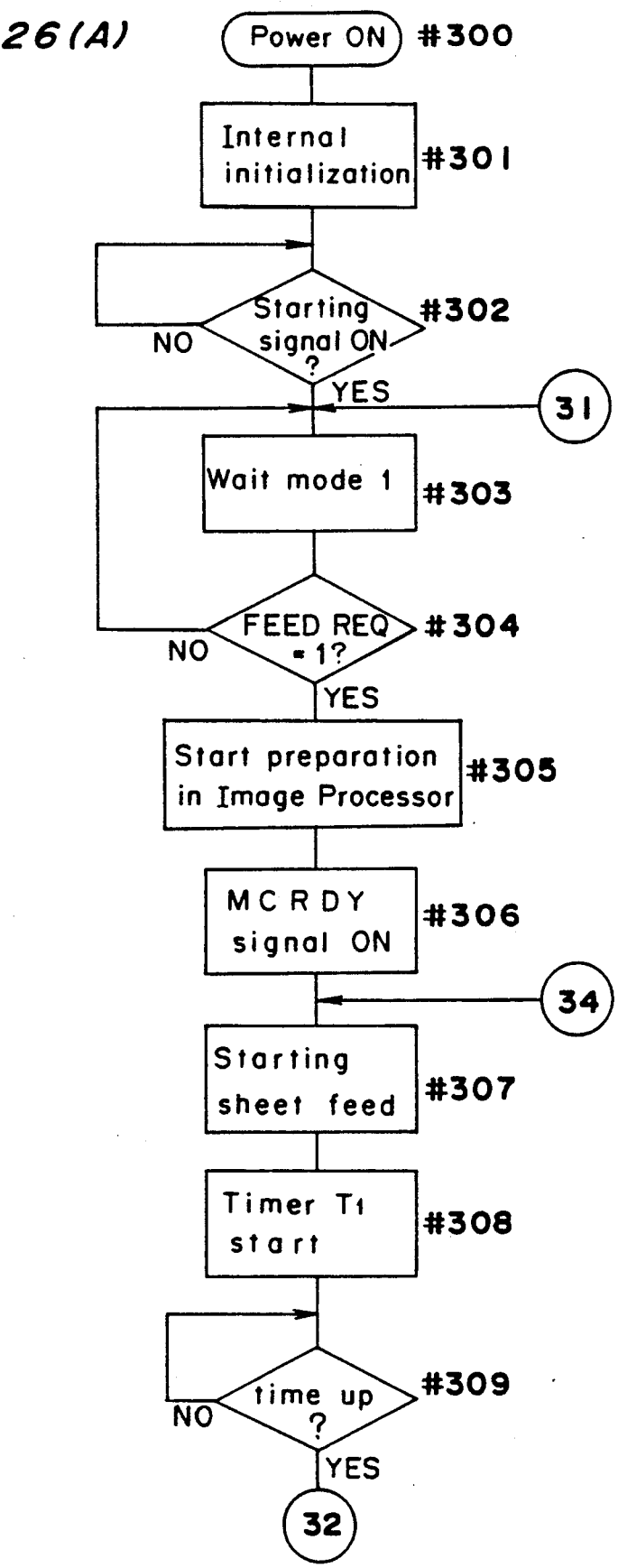

FIG. 26 shows operations of the electro-photographic controller 41.

When the power is turned on at step #300, the electro-photographic controller 41 is initialized internally at step #301 and, then, waits for a starting signal (step #202) at step #302.

When the starting signal is detected, EPC 41 is put in a waiting state of Mode 1 at step #303 until FEEDREQ signal is outputted by the interface controller at step #304. In the Mode 1, a temperature control of the fixing means and a turning ON of the cooling fan are merely done without rotating the main motor and the drum.

When EPC 41 receives FEEDREQ signal at step #304, the processing portion for imaging are started to print an image at step #305, EPC outputs MCRDY signal to the interface controller 40 at step #306 which indicates that it is in a state ready for the print and, then, a feeding operation of a sheet is started at step #307. At the same time of the start of sheet feed, a predetermined timer $T_1$ is set at step #308, and, when the timer $T_1$ times up at step #309 which is provided for indicating that the sheet has been fed to the waiting position predetermined, EPC outputs PRDY signal indicating the completion of preparation of the sheet to the print head controller 42 at step #310 and stops the sheet feed at step #311.

Figure 27:
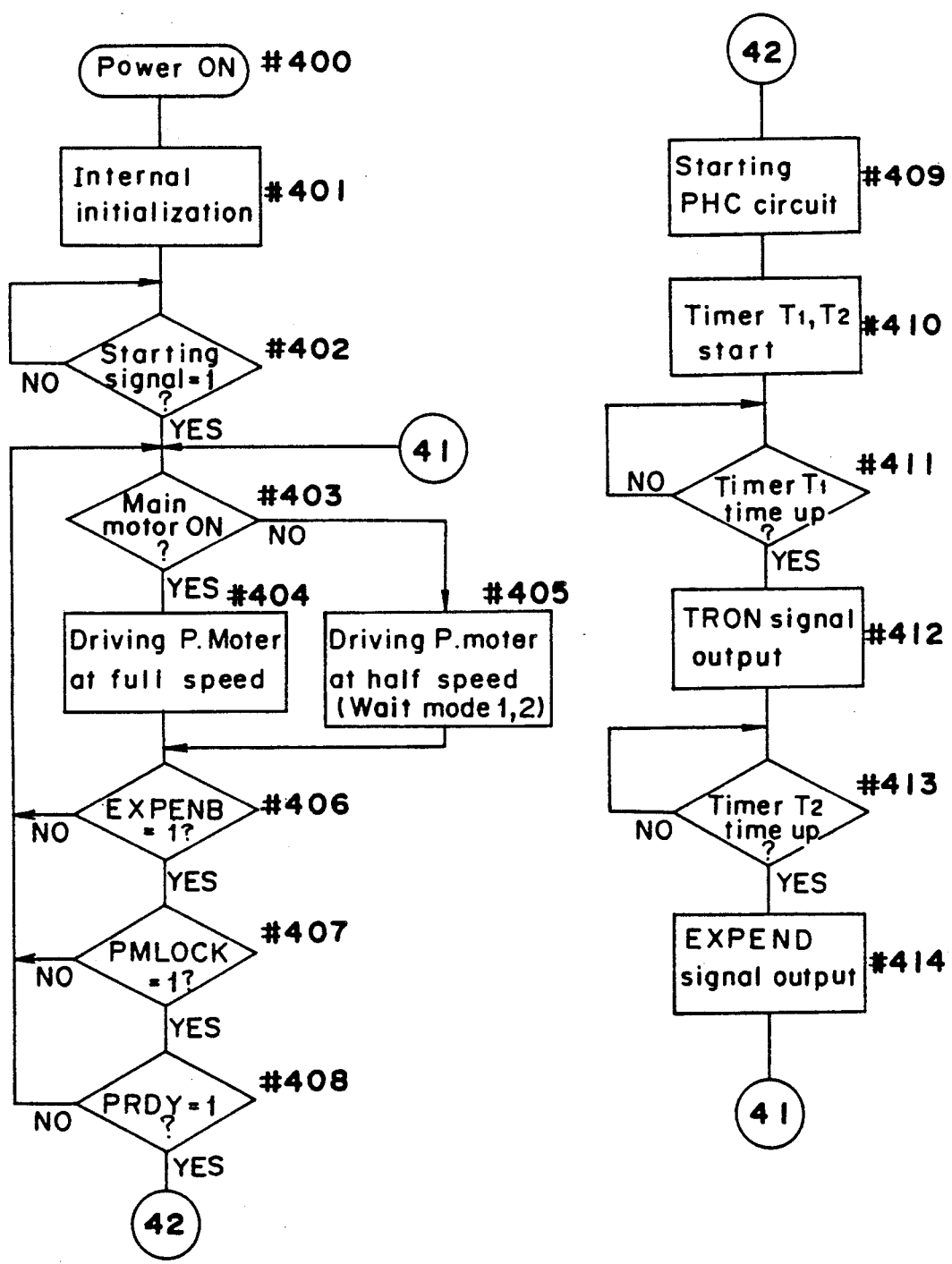
FIG. 27 is a flow chart showing operations of the print head controller.

Usually, the print command PRNCMD is outputted from the bit map controller 30 just after step #311 and, then, TRON signal for restarting the sheet is outputted from the print head controller 42 (at step #412 of FIG. 27). When EPC detects TRON signal at step #318, the sheet at the waiting position is restarted at step #319, an image formed on the photo-sensitive drum is transferred onto the sheet. Then, EPC 41 sets another timer $T_2$ at step #320 to wait for the next FEEDREQ signal at step #321. When FEEDREQ is received at step #321, the process returns to step #307 in order to start the next sheet feed. If it is not received until the time up of the timer $T_2$ (YES at step #322), the process returns to step #303 for waiting in the waiting Mode 1.

If TRON signal is not outputted from the print head controller 42 due to the reason that a processing time in the bit map controller 30 or a transmission time from the data processor 1 becomes long, in other words, in the case wherein the print command signal is not outputted from the bit map controller 30 to the interface controller 40, the interface controller 40 outputs STANDBY signal. When EPC 41 detects this signal at step #312, it makes MCRDY signal off at step #313 and, then, enters into a waiting state of Mode 2 at step #314. In this Mode 2, all processes including the main motor are stopped and the sheet is kept at the waiting position. This is done in order to prevent wear of individual portions of the printer unnecessarily. After that, when the processing for transforming signals by the bit map controller 30 has been completed and STANDBY signal is turned OFF by the interface controller 40. EPC 41 detects these at step #315, restarts the image processing means at step #316 and outputs MCRDY signal again to the interface controller 40 at step #317.

(f) Control flow of Print head

FIG. 27 shows a processing flow to be done by the print head controller 42. The print head controller 42 initializes internal parts thereof at step #401 when the power is turned ON at step #400 and, if it detects the starting signal (step #202) from the interface controller 40 at step #402, it enters into the processing loop.

In the processing loop, it is put in a waiting state for starting the print. There are provided three conditions for starting the print.

One of them is EXPENB (step #406) from the interface controller 40 which is a signal for permitting an exposure by a laser beam being outputted from the interface controller 40 at step #217 of FIG. 23.

Another one is PMLOCK signal which indicates that the polygon motor 432 has attained to a predetermined number of revolutions. The polygon motor 432 is controlled at a timing identical to that of the main motor at #403 and, as far as EPC 41 is kept in a waiting state of Mode 1 or 2 and the main motor is stopped, it is driven at about one half of a regular revolutional speed thereof in order to elongate the life-time at step #405. When the print operation is started and the main motor is turned ON, the revolutional speed is increased to the full speed being equal to the regular one mentioned above at step #404. And, when the revolutional speed thereof becomes stable at the regular one, PMLOCK signal indicating this is outputted from the driving circuit 427.

The last condition is checked with PRDY from EPC 41 in order to determine whether the sheet is located at a position where it can synchronize with an image formed on the drum. When all of three conditions are satisfied, EPC sends a start signal to the print head control circuit 426 to start an exposure at step #409. The print head control circuit 426 requests image data to the bit map write means 31 successively and controls the emission of light of the laser diode 431 based upon data received. Further, the print head controller 42 makes two timers $T_1$, $T_2$ start at step #410. The timer $T_1$ is a timer wherein the time thereof is fixed irrespective to a size of a sheet. When this timer $T_1$ times up at step #411, the sheet at the waiting position is restarted in order to control a regist timing and TRON signal is outputted to EPC 41 at step #412.

On the contrary, the timer $T_2$ is provided for synchronizing with the bit map controller 30 and, therefore, a time to be set therein is dependent on a size of a sheet to be printed. When the timer $T_2$ is over at step #413, EXPEND signal is outputted to the interface controller 40 at step #414.

While there has been described the preferred embodiments, modifications and variations being obvious to those skilled in the art are possible without departing from the spirit of the invention. The scope is therefore to be determined solely by the appended claims.

What is claimed is:

1. A printer which temporally stores printing data received from an external data processor and is capable of printing out images according to said stored printing data in a manner independent of the external data processor, comprising:
   receive means for receiving said printing data and control data different from said printing data;
   memory means for storing said printing data and control data;
   print control means for printing out images according to said printing data read out from said memory means;
   entry means for permitting the entry of a plurality of different signals, and
   deletion means, responsive to an entered control signal, for deleting said printing data stored in said memory means by an amount determined according to the kind of the entered control signal.

2. The printer of claim 1, wherein the amount of stored printing data to be deleted by said deletion means can be changed based on the number of control signals entered by said entry means.

3. The printer of claim 1, wherein the printing data to be deleted by said deletion means is distinguished by a predetermined control data stored together with said printing data in said memory means from the printing data which is to remain in the memory means.

4. A printer which temporally stores printing data received from an external data processor and is capable of printing out images according to said stored printing data in a manner independent of the external data processor, comprising:
   receive means for recieving said printing data and control data different from said printing data;
   transforming means for transforming said printing data into bit data of an image to be printed;
   memory means for storing said bit data;
   print control means for printing out the image on a sheet of paper, which has been preliminarily fed to the printer before the completion of transforming the bit data, according to said bit data read out from said memory means;
   entry means for permitting the entry of a plurality of different control signals, and
   suspension means for executing a compulsory discharge of said preliminarily fed sheet when said entry means enters a control signal indicating the suspension of a printing operation.

5. The printer of claim 4, further comprising deletion means for deleting said printing data stored in said memory means upon receipt of the control signal indicating suspension of a printing operation.

6. A printer which temporally stores printing data received from an external data processor and is capable of printing out images according to said stored printing data in a manner independent of the external data processor, comprising:
   communication means for communicating with said external data processor to receive said printing data and control data different from said printing data;
   memory means for storing said printing data and control data;
   print control means for printing out images according to said printing data read out from said memory means;
   entry means for permitting the entry of a plurality of different control signals;
   deletion means, responsive to an entered control signal, for deleting said printing data stored in said memory means by an amount determined according to the kind of entered control signal, and
   output means for outputting a predetermined code to said external data processor via said communication means if any predetermined control data is not stored in said memory means when said deletion means is activated.

7. The printer of claim 6, wherein the amount of printing data to be deleted by said deletion means is changed based on the number of control signals entered by said entry means.

8. The printer of claim 6, wherein the printing data to be deleted by said deletion means is distinguished by a predetermined control data stored together with said printing data in said memory from the printing data which is to remain in said memory means.

9. A printer which temporally stores printing data received from an external data processor and prints out images according to said stored printing data in a manner independent of the external data processor, comprising:

receive means for receiving said printing data and control data different from said printing data;

memory means for storing said printing data and control data;

entry means for entering a deletion command;

print control means for printing out images according to said printing data read out from said memory means, and deletion means responsive to the deletion command, for deleting the printing data stored in said memory means by an amount partitioned by a specific control data which is used for partition between one and another sequence of the printing data.

10. The printer of claim 9, wherein the printing data to be deleted by said deletion means is distinguished by a predetermined control data stored together with said printing data in said memory means from the printing data which is to remain in storage.

11. A printer which temporally stores printing data received from an external data processor and prints out images according to said memorized printing data in a manner independent of the external data processor, comprising:

communication means for communicating with said external data processor to receive said printing data and control data different from said printing data, said control data including commands to delete a specific amount of predetermined printing data from storage;

memory means for storing said printing data and control data;

printing control means for printing out images according to said printing data read out from said memory means;

deletion means, responsive to the control data commands which designate the deletion of printing data, for deleting said printing data stored in said memory means by an amount determined according to said control data, and output means for outputting a predetermined code to said external data processor via said communication means if any predetermined control data is not stored in said memory means via said communication means when said deletion means is activated.

12. The printer of claim 11, wherein the printing data to be deleted by said deletion means is distinguished by a predetermined control data command memorized together with said printing data in said memory means from the printing data to remain in storage.

* * * * *